United States Patent
Nagendran et al.

(10) Patent No.: US 12,499,067 B1
(45) Date of Patent: Dec. 16, 2025

(54) COMMUNICATION ARCHITECTURE FOR MULTICORE SYSTEM

(71) Applicant: Amazon Technologies, Inc., Seattle, WA (US)

(72) Inventors: Arun Kumar Nagendran, Chennai (IN); Hankyul You, Sunnyvale, CA (US); Praveen Chebolu, Leander, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/756,091

(22) Filed: Jun. 27, 2024

(51) Int. Cl.
*G06F 13/16* (2006.01)
*G06F 13/24* (2006.01)

(52) U.S. Cl.
CPC ...... *G06F 13/1663* (2013.01); *G06F 13/1673* (2013.01); *G06F 13/24* (2013.01)

(58) Field of Classification Search
None
See application file for complete search history.

(56) References Cited

U.S. PATENT DOCUMENTS

| | | | |
|---|---|---|---|
| 10,560,262 B2* | 2/2020 | Shimizu | G09C 1/00 |
| 10,785,296 B1* | 9/2020 | Allison | H04L 67/1095 |
| 2015/0046661 A1* | 2/2015 | Gathala | G06F 12/023 |
| | | | 711/147 |
| 2017/0132130 A1* | 5/2017 | Ramakrishnan | G06F 12/0815 |
| 2022/0292626 A1* | 9/2022 | Agostini | G06T 1/20 |

* cited by examiner

*Primary Examiner* — Michael Sun
(74) *Attorney, Agent, or Firm* — Pierce Atwood LLP

(57) ABSTRACT

A device can provide a unified and scalable multiprocessor communication framework that enables communication between multiple processor cores in a multicore device. For example, the device may be configured to perform data payload management using a Smart Message Queue (SMQ) and/or shared memory. Additionally or alternatively, the communication framework may enable the processors to communicate with each other and/or peripherals of the device while abstracting details of various communication protocols, hardware interfaces, and/or the like. For example, the communication framework may provide a common interface for applications, enabling a first application associated with a processor to establish a connection to any processor and/or peripheral without knowing details of a communication protocol for each connection.

20 Claims, 12 Drawing Sheets

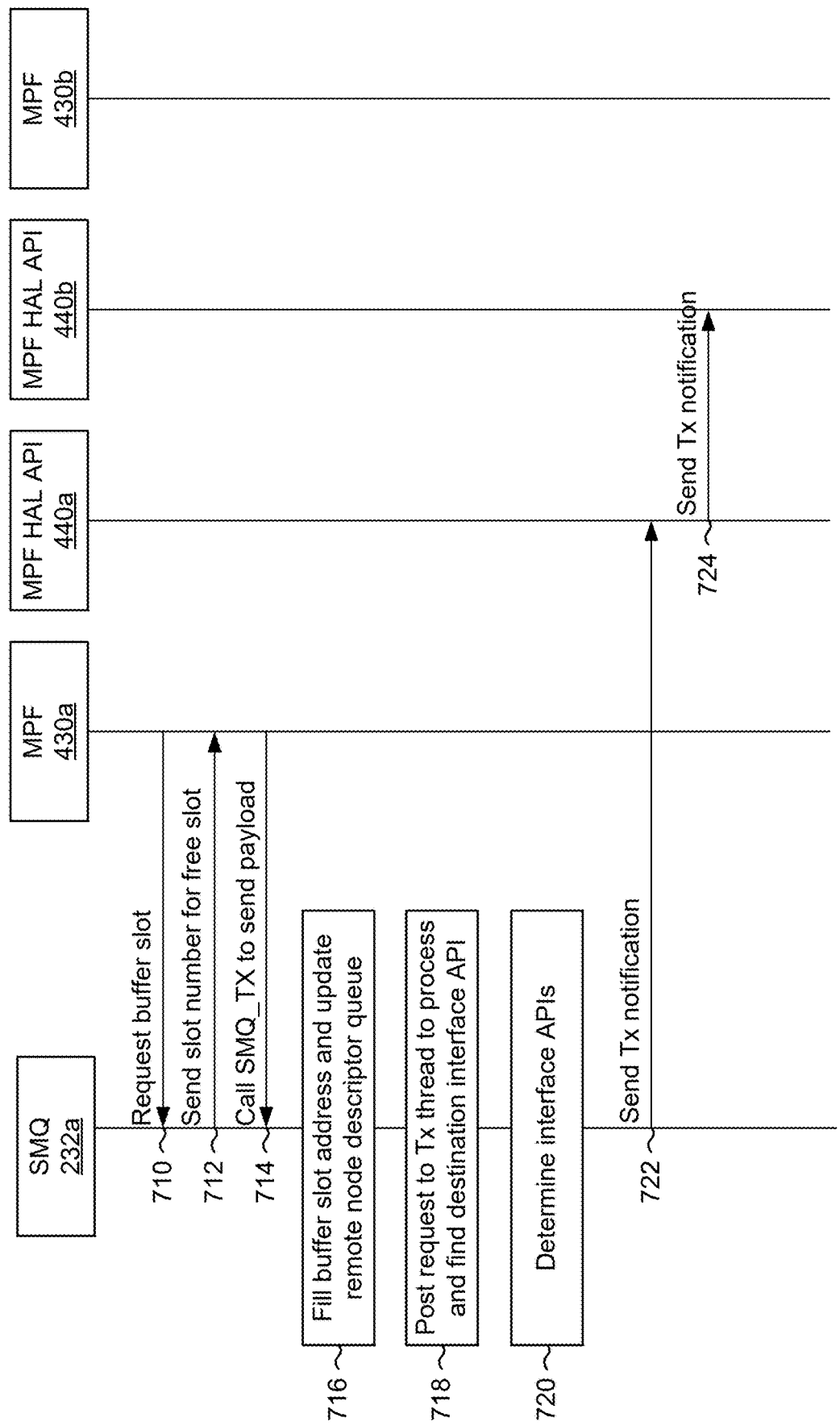

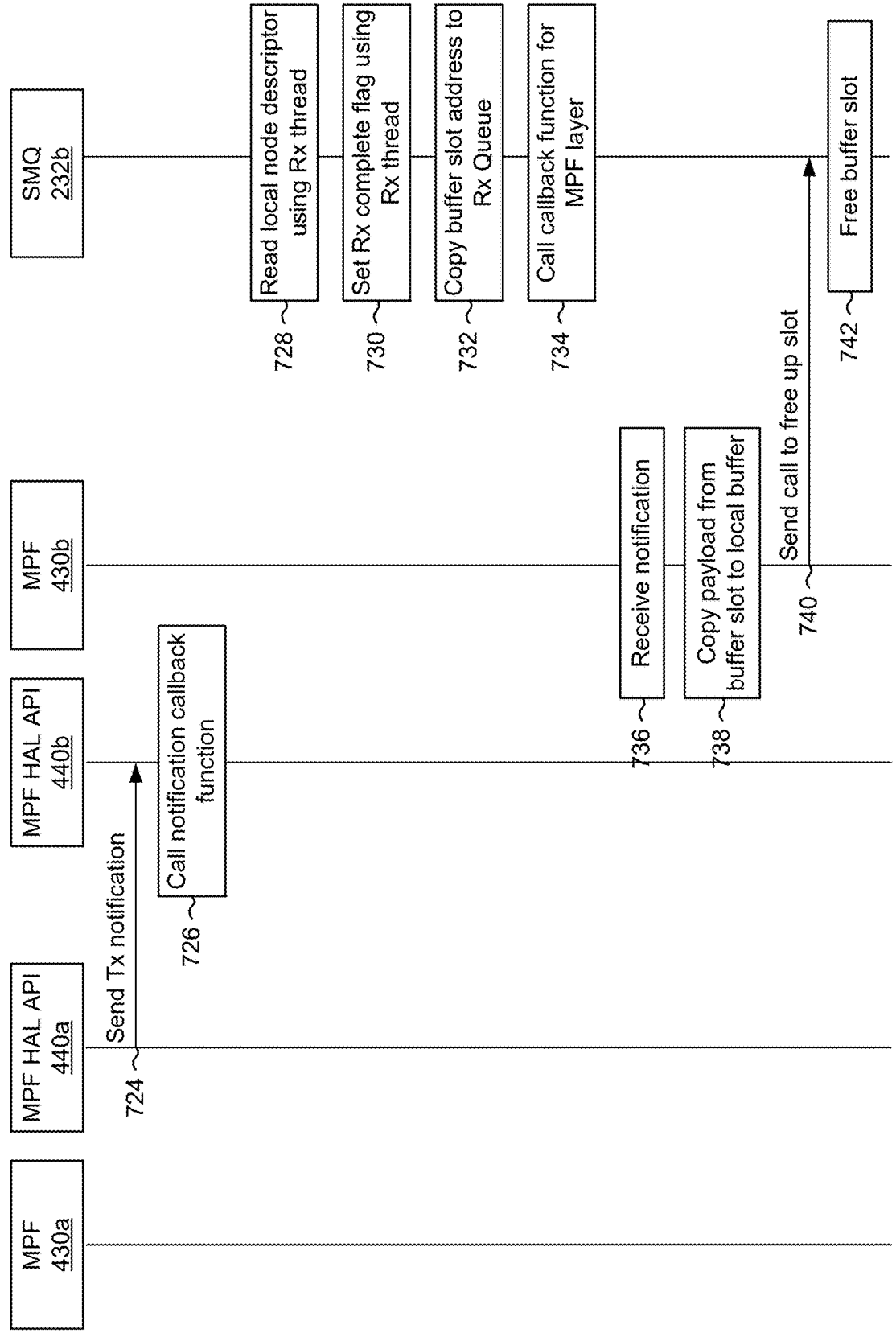

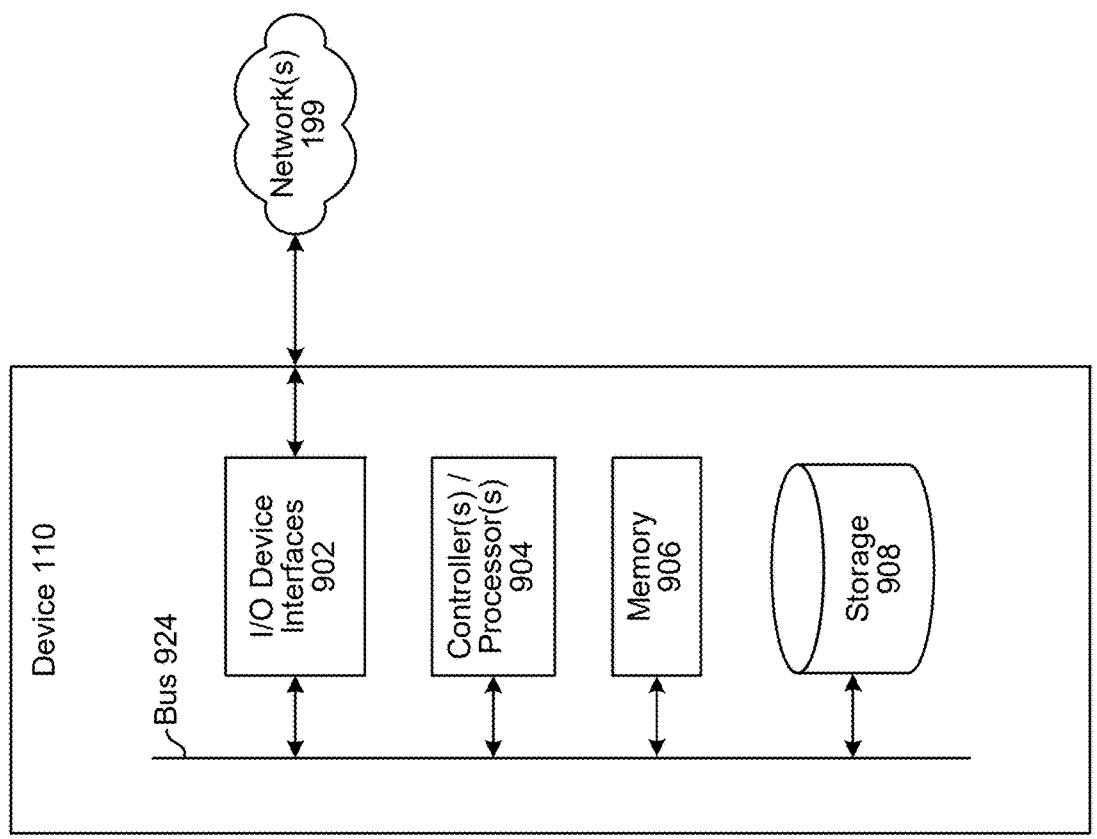

COMMUNICATION ARCHITECTURE FOR MULTICORE SYSTEM

BACKGROUND

With the advancement of technology, the use and popularity of electronic devices has increased considerably. To improve performance, some electronic devices include multiple processors to reduce power consumption and/or perceived latency.

BRIEF DESCRIPTION OF DRAWINGS

For a more complete understanding of the present disclosure, reference is now made to the following description taken in conjunction with the accompanying drawings.

FIGS. 7A-7B are network communication diagrams conceptually illustrating an example of exchanging data between multiple processors according to embodiments of the present disclosure.

FIG. 9 is a block diagram conceptually illustrating a device 110 that may be used with the system.

DETAILED DESCRIPTION

Electronic devices may be used to capture audio/video and process audio data and/or image data. The audio data and/or image data may be used to generate an output for a user (e.g., generate output audio, display a notification, etc.), to process input commands (e.g., interpret a voice command), as part of a communication session (e.g., videoconference), and/or the like. Some devices include multiple processors specialized for different tasks.

To improve communication architecture for a multicore device, devices, systems and methods are disclosed that provide a unified and scalable multiprocessor communication framework that enables communication between multiple processor cores in a single device. For example, the communication framework may be configured to utilize multiple routing schemes, enabling processors to communicate with each other while abstracting details of the various communication protocols and/or interfaces. In addition, the communication framework may include a smart message queue (SMQ) that is configured to abstract details of hardware drivers while enabling data to be transferred between processors using shared memory. For example, the SMQ facilitates a first processor storing a payload in a buffer slot in the shared memory, a second processor retrieving the payload from the buffer slot, and the shared memory freeing the buffer slot for future processing.

Figure 1A:
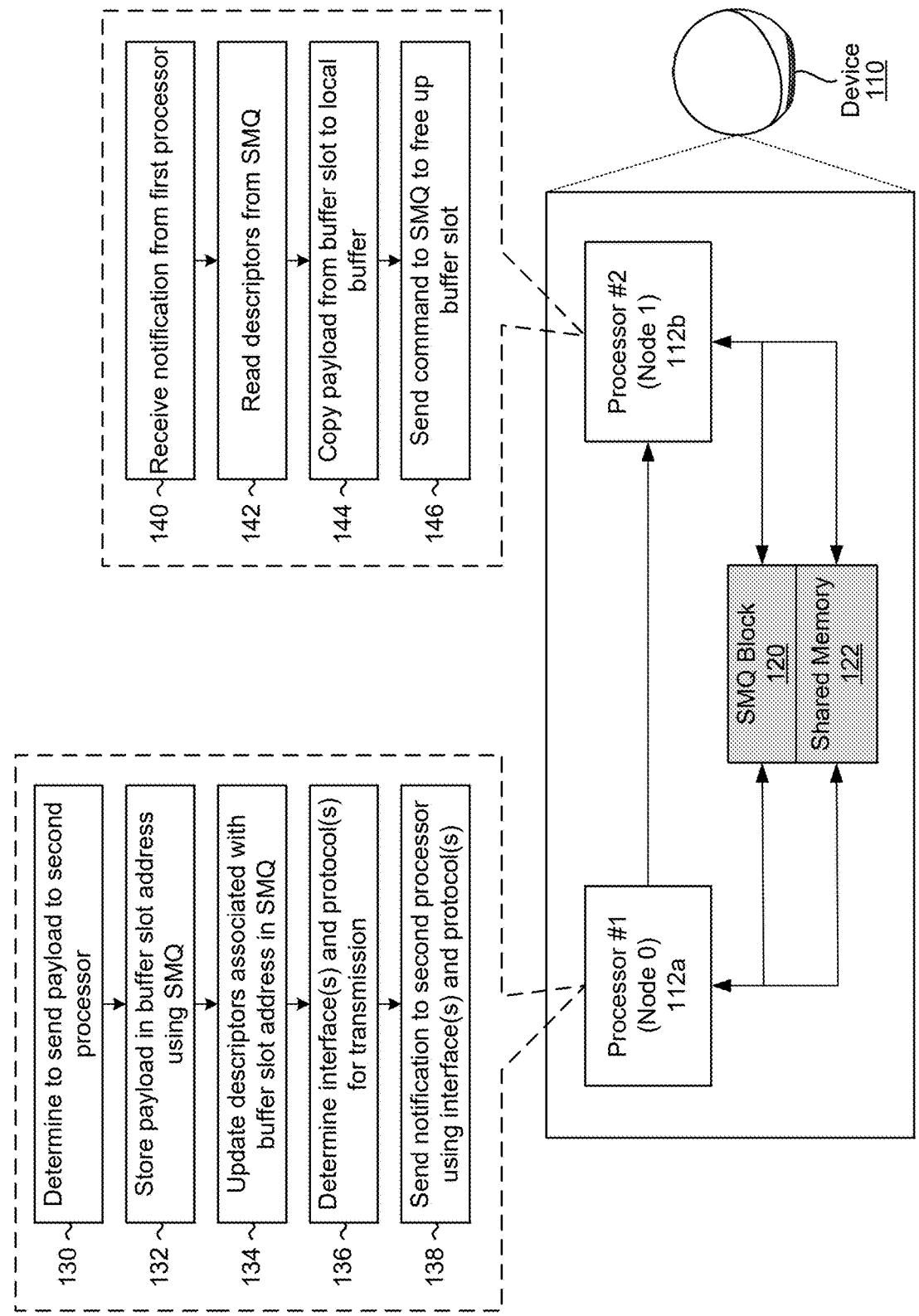
FIG. 1A illustrates a system configured to communicate between multiple processors using a common interface according to embodiments of the present disclosure.

FIG. 1A illustrates a system configured to communicate between multiple processors using a common interface according to embodiments of the present disclosure. Although FIG. 1A and other figures/discussion illustrate the operation of the system in a particular order, the steps described may be performed in a different order (as well as certain steps removed or added) without departing from the intent of the disclosure. The device 110 illustrated in FIG. 1A corresponds to a speech-enabled device that is configured to generate audio data in order to process voice commands, although the disclosure is not limited thereto.

As illustrated in FIG. 1A, a device 110 may be an electronic device that includes multiple processors 112 (e.g., cores, nodes, etc.) and is capable of sending and/or receiving data between the processor(s) 112 and/or peripherals of the device 110. For example, the device 110 may include one or more application processors (APs) (e.g., graphics, input/output, etc.), one or more microcontroller units (MCUs), one or more microprocessor units (MPUs), one or more digital signal processors (DSPs), one or more digital signal controllers (DSCs), one or more processors (e.g., a host processor or central processing unit (CPU), one or more graphics processors, a baseband processor, etc.), and/or the like without departing from the disclosure. In addition, the device 110 can include additional components, such as input-output (I/O) devices, memory devices, storage devices, and/or the like. For example, the device 110 may include a memory storing instructions that, when executed by the processing device, configure the device 110 to perform the operations described herein.

As will be described in greater detail below, the device 110 may be configured to perform data payload management using a Smart Message Queue (SMQ) block 120 and/or a shared memory 122. For example, the device 110 may be configured to send first data (e.g., payload) from a first processor 112a (e.g., Processor #1 or Node 0) to a second processor 112b (e.g., Processor #2 or Node 1). As illustrated in FIG. 1A, the first processor 112a may send the first data to the second processor 112b using the SMQ block 120 and/or the shared memory 122. Additionally or alternatively, the device 110 may include a communication framework that enables the processors 112 to communicate with each other and/or peripherals of the device 110 while abstracting details of various communication protocols, hardware interfaces, and/or the like. For example, the communication framework may provide a common interface for applications, enabling a first application associated with the first processor 112a to establish a connection to any processor 112 (e.g., second processor 112b) and/or peripheral without knowing details of a communication protocol for each connection.

As illustrated in FIG. 1A, the first processor 112a may determine (130) to send payload data to the second processor 112b and may store (132) the payload data in a buffer slot address using the SMQ block 120. For example, the first processor 112a may request a free buffer slot address from the SMQ block 120 and the SMQ block 120 may (i) identify an available buffer slot in the shared memory 122 and (ii) return a buffer slot address associated with the available buffer slot.

The first processor 112a may update (134) descriptors associated with the buffer slot address in the SMQ block 120, may determine (136) interface(s) and/or communication protocol(s) for transmission (e.g., sending the payload data and/or a notification to the second processor 112b), and may send (138) a notification to the second processor 112b using the interface(s) and/or protocol(s) determined in step 136. In some examples, the first processor 112a may include first SMQ logic that is configured to perform steps 134-138, as will be described in greater detail below with regard to FIGS. 4-6.

As illustrated in FIG. 1A, the second processor 112b may receive (140) the notification from the first processor 112a and may perform a series of actions to retrieve the payload data from the shared memory 122. In the example illustrated in FIG. 1A, in response to receiving the notification the second processor 112b may read (142) descriptors from the SMQ block 120 and may copy (144) the payload data from the buffer slot to a local buffer associated with the second processor 112b. For example, the second processor 112b may identify descriptors corresponding to the notification (e.g., associated with the receiving node, which in this case is the second processor 112b), may determine the buffer slot address indicated by the descriptors, and may use the buffer slot address to copy the payload data from the shared memory 122.

After the payload data is copied to the local buffer, the second processor 112b may send (146) a command to the SMQ block 120 to free up the buffer slot. For example, the SMQ block 120 may reset a flag, update descriptor(s), and/or perform other actions to release the buffer slot so that it is available for future processing.

Figure 1B:
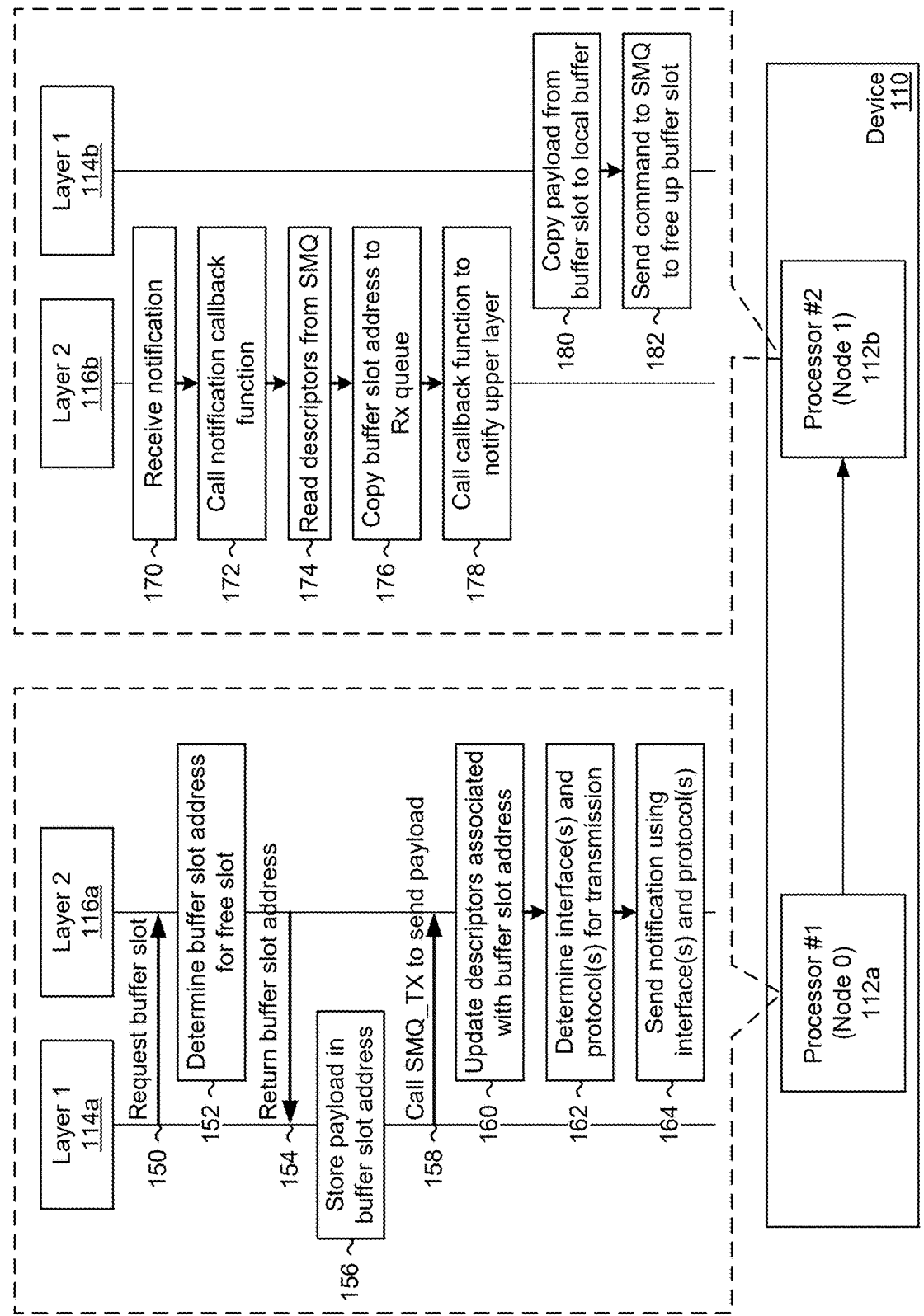
FIG. 1B illustrates a system configured to exchange data between multiple processors using a shared queue according to embodiments of the present disclosure.

FIG. 1B illustrates a system configured to exchange data between multiple processors using a shared queue according to embodiments of the present disclosure. While FIG. 1A illustrates an example of sending payload data between processors using the SMQ block 120 and/or the shared memory 122, FIG. 1B is directed to details about communication between individual layers within the first processor 112a and/or the second processor 112b. As described in greater detail below with regard to FIGS. 2A-3, how the device 110 communicates between processors 112 can be represented using a communication model comprised of multiple layers. For example, the first processor 112a may be connected to the second processor 112b via a physical channel, which corresponds to a lowest layer in the communication model. In addition, each processor 112a/112b may manage additional layers, which build on each other and iteratively abstract details associated with a lower layer.

In the example illustrated in FIG. 1B, the first processor 112a may be associated with a first upper layer 114a ('Layer 1') and a first lower layer 116a ('Layer 2'), while the second processor 112b may be associated with a second upper layer 114b ('Layer 1') and a second lower layer 116b ('Layer 2'). Thus, the first upper layer 114a abstracts details from the first lower layer 116a and the second upper layer 114b abstracts details from the second lower layer 116b. For example, the first lower layer 116a and the second lower layer 116b may be configured to determine hardware interface(s) and/or communication protocol(s) required to establish a connection. In contrast, the first upper layer 114a may communicate with the second upper layer 114b without knowing details about the hardware interface(s) and/or the communication protocol(s) used to establish the connection.

As illustrated in FIG. 1B, the first upper layer 114a may request (150) a buffer slot from the first lower layer 116a, the first lower layer 116a may determine (152) a buffer slot address for a free slot in the shared memory 122, and the first lower layer 116a may return (154) the buffer slot address to the first upper layer 114a. Using the buffer slot address, the first upper layer 114a may store (156) payload data in the buffer slot address of the shared memory 122 and may call (158) the SMQ (e.g., SMQ_TX) to send the payload data to the second processor 112b. In some examples, the first upper layer 114a may send the call to the first lower layer 116a, although the disclosure is not limited thereto.

In response to receiving the call, the first lower layer 116a may update (160) descriptors associated with the buffer slot address, determine (162) interface(s) and communication protocol(s) for transmission, and send (164) a notification to the second processor 112b using the interface(s) and the communication protocol(s).

As illustrated in FIG. 1B, the second lower layer 116b associated with the second processor 112b may receive (170) the notification and may call (172) a notification callback function (e.g., invoke the notification callback function). For example, the second lower layer 116b may call the SMQ associated with the second processor 112b, although the disclosure is not limited thereto. The second lower layer 116b may read (174) descriptors from the SMQ block 120, may copy (176) the buffer slot address to a Rx queue, and may call (178) a callback function to notify the second upper layer 114b.

In response to the callback function, the second upper layer 114b may copy (180) the payload data from the buffer slot in the shared memory 122 and may send (182) a command to the SMQ block 120 to free up the buffer slot.

Figure 2A:
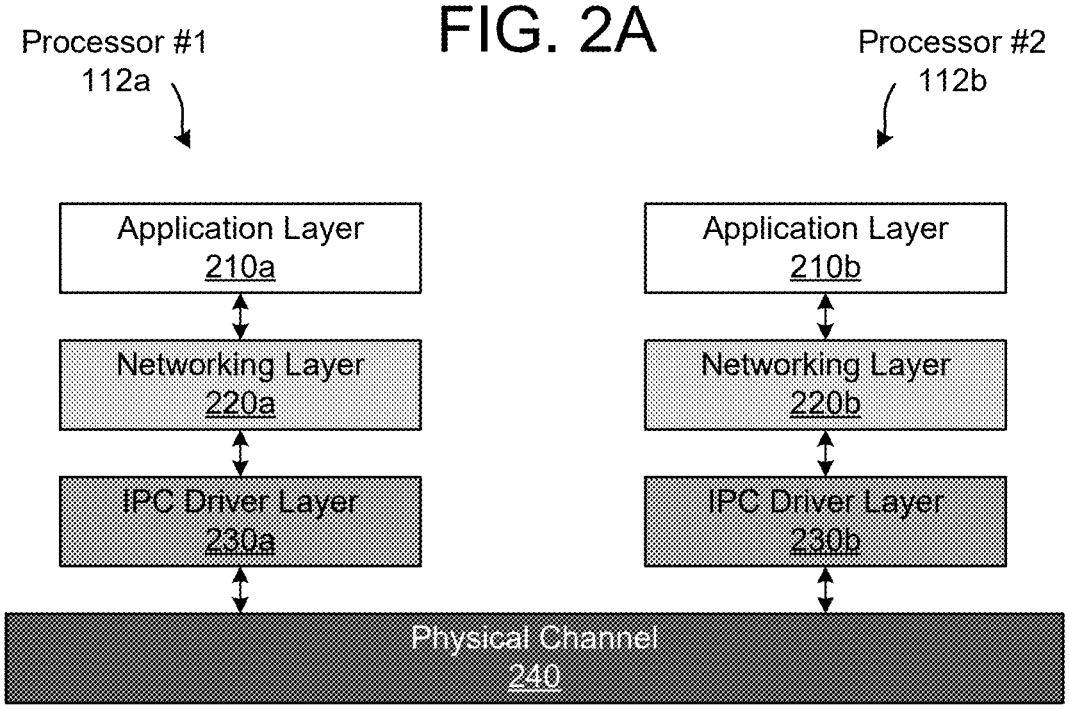
FIGS. 2A-2C illustrate examples of layer models according to embodiments of the present disclosure.
Figure 2B:
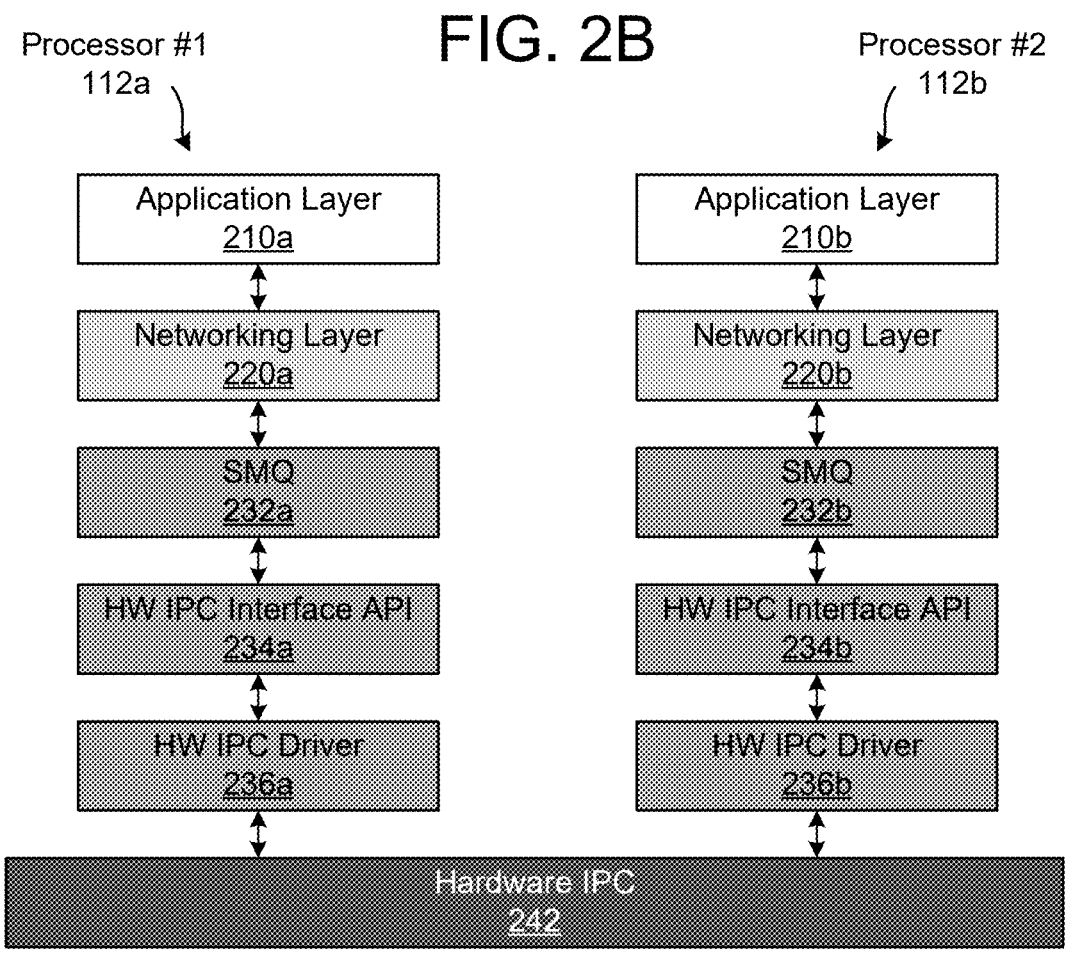
Figure 2C:
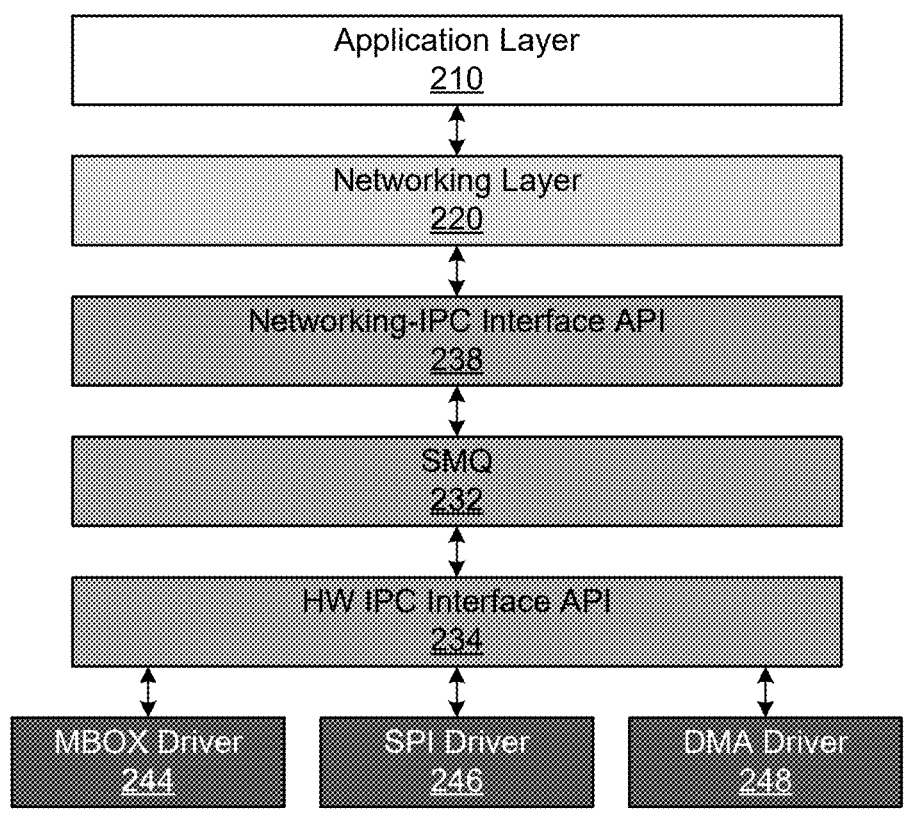

FIGS. 2A-2C illustrate examples of layer models according to embodiments of the present disclosure. As illustrated in FIGS. 2A-2C, how the device 110 communicates between processors can be represented using several different communication models, with a number of layers varying between these communication models. For example, FIG. 2A illustrates a first model that includes four layers, FIG. 2B illustrates a second model that includes six layers, and FIG. 2C illustrates a third model that also includes six layers. The disclosure is not limited thereto, however, and the number of layers included in each communication model may vary without departing from the disclosure. Additionally or alternatively, a single layer may be represented using two or more distinct levels without departing from the disclosure. For example, all three models may correspond to four layers, but the second model and the third model may separate a second layer into three separate levels without departing from the disclosure.

FIG. 2A illustrates an example representation of how to visualize how the device 110 exchanges data between multiple processors using a first communication model. As illustrated in FIG. 2A, multiple processors 112 (e.g., cores, nodes, etc.) may be connected via a physical channel 240, which corresponds to a first layer in the first model. In addition, each individual processor may manage three additional layers, which build on each other and iteratively abstract details associated with a lower layer. For example, a first processor 112a ("Processor #1") may include a first Inter Processor Communication (IPC) driver layer 230a, a first networking layer 220a, and a first application layer 210a. Similarly, a second processor 112b ("Processor #2") may include a second IPC driver layer 230b, a second networking layer 220b, and a second application layer 210b. For ease of illustration, Inter Processor Communication (IPC) and Multi Processor Communication (MPC) may be used interchangeably without departing from the disclosure.

As described above, the layers work together to effectively communicate with each other and/or other processors 112, while masking details about the transmission process. For example, the first application layer 210a may correspond to a component within an application that controls communication with the second processor 112b and/or other processors 112. In some examples, the first application layer 210a may correspond to an abstraction layer service, although the disclosure is not limited thereto.

Each of the layers in the first model handle different communication functions. In some examples, they do this by transferring specific information between upper layers and lower layers during data processing and information exchange. For example, the physical channel 240 may correspond to a physical layer that physically links components within the device 110, such as the first processor 112a, the second processor 112b, and/or the like. In some examples, the IPC driver layer 230 may correspond to a data link layer that defines how data is transferred over a connecting link, although the disclosure is not limited thereto. Additionally or alternatively, the networking layer 220 may correspond to a network layer that determines how messages move across the device 110, such as end-to-end movement of data packets using logical addresses. While the above description refers to similarities between the first model and an Open Systems Interconnection (OSI) communications model, this is intended to conceptually illustrate a simple example and the disclosure is not limited thereto.

Referring back to FIG. 2A, the first application layer 210a associated with the first processor 112a may determine to send first data to the second application layer 210b associated with the second processor 112b. In this example, the first application layer 210a may transfer specific information to the first networking layer 220a and/or the first IPC driver layer 230a in order to enable the first data to be transmitted to the second processor 112b via the physical channel 240. In some examples, the device 110 may send data and/or information directly between the first application layer 210a, the first networking layer 220a, and/or the first IPC driver layer 230a. The disclosure is not limited thereto, and in other examples the device 110 may communicate between these layers by sending request(s), notification(s), and/or the like. Additionally or alternatively, the device 110 may communicate between these layers by calling (e.g., invoking) a specific function (e.g., SMQ_TX, notification callback function, callback function, SMQ_Free, etc.), by storing data in a local buffer (e.g., specific to the first processor 112a), by storing data in shared memory (e.g., available buffer slot in the shared memory 122), updating descriptors associated with the shared memory and/or a shared queue, and/or the like without departing from the disclosure, as will be described in greater detail below.

As illustrated in FIG. 2A, the second processor 112b may receive data and/or information from the first processor 112a via the physical channel 240. For example, the second IPC driver layer 230b may receive communication data, which may correspond to a notification, the first data, a first memory address associated with the first data, and/or the like, and may send the communication data and/or other information to the second networking layer 220b and/or the second application layer 210b without departing from the disclosure. As described above, the device 110 may send data and/or information directly between the second IPC driver layer 230b, the second networking layer 220b, and/or the second application layer 210b. The disclosure is not limited thereto, and in other examples the device 110 may communicate between these layers by sending request(s), notification(s), and/or the like. Additionally or alternatively, the device 110 may communicate between these layers by calling a specific function (e.g., SMQ_TX, notification callback function, callback function, SMQ_Free, etc.), by storing data in a local buffer (e.g., specific to the second processor 112b), by storing data in shared memory (e.g., available buffer slot in the shared memory 122), updating descriptors associated with the shared memory and/or the shared queue, and/or the like without departing from the disclosure, as will be described in greater detail below.

As will be described in greater detail below with regard to FIGS. 4-6, in some examples the first processor 112a may send the first data to the second processor 112b using shared memory and/or a shared queue. For example, the first processor 112a may interface with the Smart Message Queue (SMQ) block 120 to store the first data in the shared memory 122 and the second processor 112b may retrieve the first data from the shared memory 122.

FIG. 2B illustrates an example representation of how to visualize how the device 110 exchanges data between multiple processors using a second communication model. In contrast to the first model illustrated in FIG. 2A, the second model separates the IPC driver layer 230a into three separate levels. In addition, the second model illustrates the first layer as a hardware IPC layer 242 instead of the physical channel 240. However, the disclosure is not limited thereto and the second model may include the physical channel 240 as the first layer without departing from the disclosure.

As illustrated in FIG. 2B, multiple processors 112 (e.g., cores, nodes, etc.) may be connected via the hardware IPC layer 242, which corresponds to the first layer in the second model. In addition, each individual processor may manage three additional layers that build on each other and iteratively abstract details associated with a lower layer, with the IPC driver layer 230 split into three levels (e.g., total of five layers/levels). For example, the first processor 112a ("Processor #1") may include a first hardware (HW) IPC driver 236a, a first HW IPC interface Application Programming Interface (API) 234a, a first Smart Message Queue (SMQ) 232a, the first networking layer 220a, and the first application layer 210a. Similarly, the second processor 112b ("Processor #2") may include a second HW IPC driver 236b, a second HW IPC interface API 234b, a second SMQ 232b, the second networking layer 220b, and the second application layer 210b.

In the second model illustrated in FIG. 2B, the networking layer 220 and/or the SMQ 232 may correspond to a common solution to manage the shared memory and payload handling, while the HW IPC interface API 234 and/or the HW IPC driver 236 may be platform specific (e.g., configured based on the device 110 itself and/or the processor 112). For example, the HW IPC interface API 234 and/or the HW IPC driver 236 may be programmed to use certain interface(s) and/or communication protocol(s) to send the payload to the co-processor, to send notification(s) to the co-processor to access the shared memory 122, and/or the like.

In some examples, the device 110 may define the SMQ management (e.g., SMQ block 120, first SMQ 232a, and/or second SMQ 232b), which may be configured to manage the first data (e.g., payload) being sent from the first networking layer 220a to the second networking layer 220b. For example, the SMQ management may be built using a common SMQ management module irrespective of the hardware IPC interface. Additionally or alternatively, the SMQ management may support both synchronous (e.g., shared memory) and asynchronous (e.g., external) IPC communication. Additional details about the SMQ management will be described below with regard to FIGS. 5-6.

In some examples, the device 110 may send data and/or information directly between the application layer 210, the networking layer 220, the SMQ 232, the HW IPC interface API 234, and/or the HW IPC driver 236 without departing from the disclosure. The disclosure is not limited thereto, and in other examples the device 110 may communicate between these layers by sending request(s), notification(s), and/or the like. Additionally or alternatively, the device 110 may communicate between these layers by calling (e.g., invoking) a specific function (e.g., SMQ_TX, notification callback function, callback function, SMQ_Free, etc.), by storing data in a local buffer (e.g., specific to the first processor 112a), by storing data in shared memory (e.g., available buffer slot in the shared memory 122), updating descriptors associated with the shared memory and/or a shared queue, and/or the like without departing from the disclosure, as will be described in greater detail below.

FIG. 2C illustrates an example representation of how to visualize how the device 110 exchanges data between multiple processors using a third communication model. In contrast to the first model illustrated in FIG. 2A, the third model separates the IPC driver layer 230a into three separate levels. In addition, the third model illustrates the first layer as corresponding to multiple interfaces, including an MBOX driver 244, a SPI Driver 246, and a DMA driver 248, although the disclosure is not limited thereto and the number of interfaces and/or type of interfaces may vary without departing from the disclosure.

As illustrated in FIG. 2C, the first processor 112 may include the HW IPC interface API 234, the SMQ 232, a networking-IPC interface API 238, the networking layer 220, and the application layer 210. In the third model, the HW IPC interface API 234, the SMQ 232, and the networking-IPC interface API 238 may correspond to three levels associated with a single layer (e.g., IPC driver layer 230a), although the disclosure is not limited thereto.

In the third model illustrated in FIG. 2C, the networking layer 220, the networking-IPC interface API 238, and/or the SMQ 232 may correspond to a common solution to manage the shared memory and payload handling, while the HW IPC interface API 234 may be platform specific (e.g., configured based on the device 110 itself and/or the processor 112). For example, the HW IPC interface API 234 may be programmed to use certain interface(s) and/or communication protocol(s) to send the payload to the co-processor, to send notification(s) to the co-processor to access the shared memory 122, and/or the like. In the example illustrated in FIG. 2C, the HW IPC interface API 234 is configured to send and receive data using the MBOX driver 244, the SPI Driver 246, and/or the DMA driver 248, although the disclosure is not limited thereto.

As described above, in some examples the device 110 may send data and/or information directly between the application layer 210, the networking layer 220, the networking-IPC interface API 238, the SMQ 232, and/or the HW IPC interface API 234 without departing from the disclosure. The disclosure is not limited thereto, and in other examples the device 110 may communicate between these layers by sending request(s), notification(s), and/or the like. Additionally or alternatively, the device 110 may communicate between these layers by calling a specific function (e.g., SMQ_TX, notification callback function, callback function, SMQ_Free, etc.), by storing data in a local buffer (e.g., specific to the first processor 112a), by storing data in shared memory (e.g., available buffer slot in the shared memory 122), updating descriptors associated with the shared memory and/or a shared queue, and/or the like without departing from the disclosure, as will be described in greater detail below.

Figure 3:
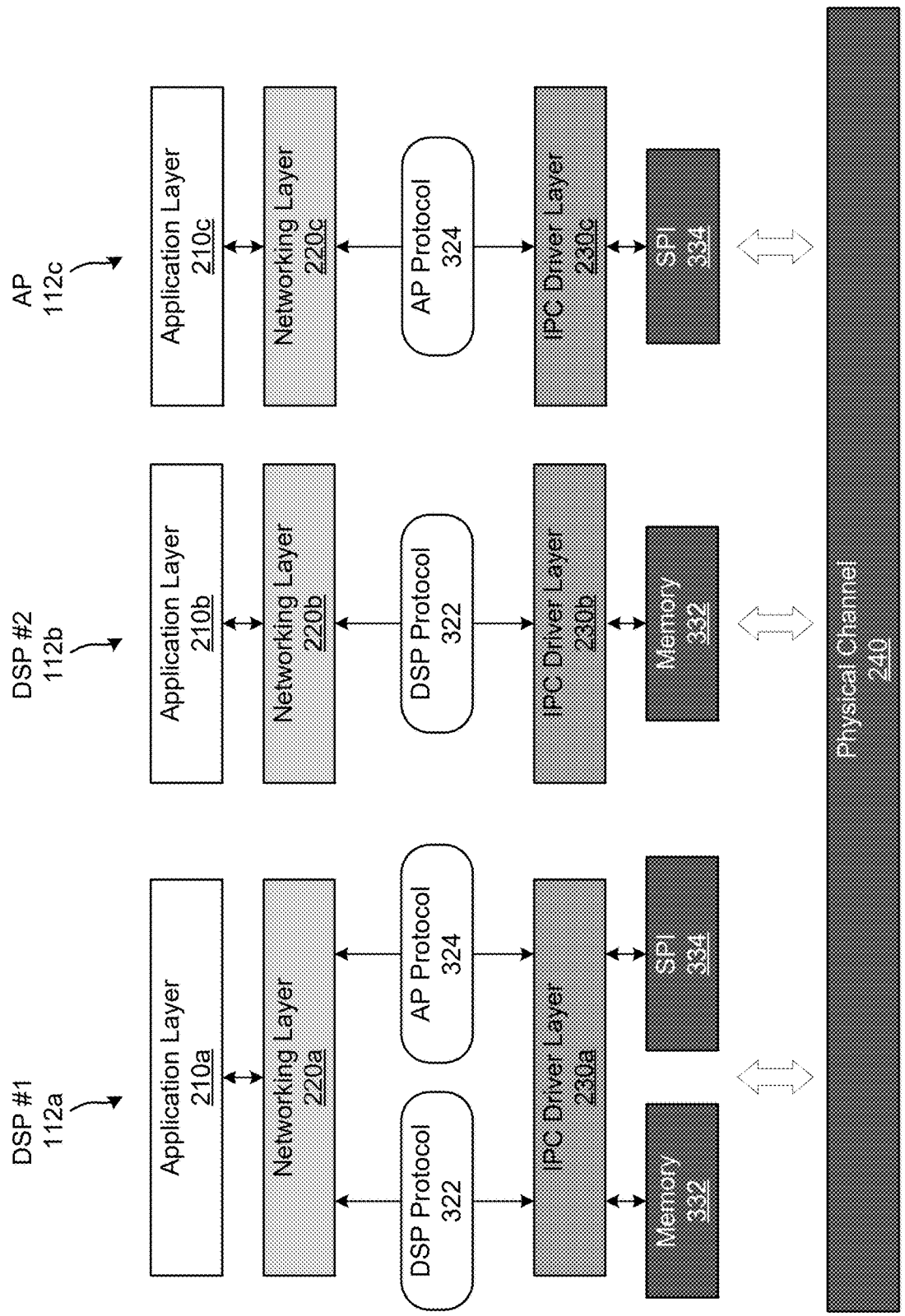
FIG. 3 illustrates an example of communicating between multiple processors according to embodiments of the present disclosure.

FIG. 3 illustrates an example of communicating between multiple processors according to embodiments of the present disclosure. As described above, the device 110 may be a multicore device that includes multiple processors (e.g., cores, nodes, etc.). For example, the device 110 may include one or more application processors (APs) (e.g., graphics, input/output, etc.), one or more microcontroller units (MCUs), one or more microprocessor units (MPUs), one or more digital signal processors (DSPs), one or more digital signal controllers (DSCs), and/or the like without departing from the disclosure.

For case of illustration, the disclosure may use the term "communication protocol" to collectively refer to communication protocol(s), standard(s), interface(s), organizational structure(s) (e.g., file formats, mail systems, storage systems, etc.), and/or the like that enable communication between the processor(s) 112 and/or peripheral(s) of the device 110. As used herein, a communication protocol may indicate data formats for data exchange, address formats for data exchange, address mapping, routing, detection of data transmission errors, direction of information flow, sequence control, flow control, and/or the like, although the disclosure is not limited thereto. Thus, the device 110 may enable communication between the processors 112 and/or peripherals using a variety of communication protocols without departing from the disclosure. For example, the device 110 may communicate using communication protocols such as Inter-Integrated Circuit (I2C) protocol, Inter-IC sound (I2S) protocol, Serial Peripheral Interface (SPI) protocol, MBOX protocol(s) (e.g., file formats, mail systems, storage systems, etc.), memory protocol(s) (e.g., MSI, MESI, MOSI, MOESI, etc.), and/or the like, although the disclosure is not limited thereto. In some examples, the physical channel 240 may correspond to the shared memory 122 and/or a bus associated with one of the communication protocols described above (e.g., SPI, I2C, I2S, etc.).

The example illustrated in FIG. 3 uses the first communication model to illustrate communication between a first processor 112a ("DSP #1"), a second processor 112b ("DSP #2"), and a third processor 112c ("AP"). For example, the first processor 112a is associated with a first application layer 210a, a first networking layer 220a, and a first IPC driver layer 230a, the second processor 112b is associated with a second application layer 210b, a second networking layer 220b, and a second IPC driver layer 230b, and the third processor 112c is associated with a third application layer 210c, a third networking layer 220c, and a third IPC driver layer 230c.

As illustrated in FIG. 3, the first networking layer 220a and the first IPC driver layer 230a may communicate using a first communication protocol (e.g., DSP protocol 322) and/or a second communication protocol (e.g., AP protocol 324), enabling the first IPC driver layer 230a to communicate with multiple interfaces, such as a first interface (e.g., memory 332) and/or a second interface (e.g., SPI 334). In contrast, the second networking layer 220b and the second IPC driver layer 230b only communicate using the first communication protocol (e.g., DSP protocol 322) and the first interface (e.g., memory 332). Similarly, the third networking layer 220c and the third IPC driver layer 230c only communicate using the second communication protocol (e.g., AP protocol 324) and the second interface (e.g., SPI 334).

In the example illustrated in FIG. 3, the first processor 112a may communicate with the second processor 112b using the first communication protocol (e.g., DSP protocol 322) and the first interface (e.g., memory 332). Separately, the first processor 112a may communicate with the third processor 112c using the second communication protocol (e.g., AP protocol 324) and the second interface (e.g., SPI 334). The disclosure is not limited thereto, however, and the first processor 112a may communicate with other processors 112 using other communication protocol(s) and/or interface(s) without departing from the disclosure.

Figure 4:
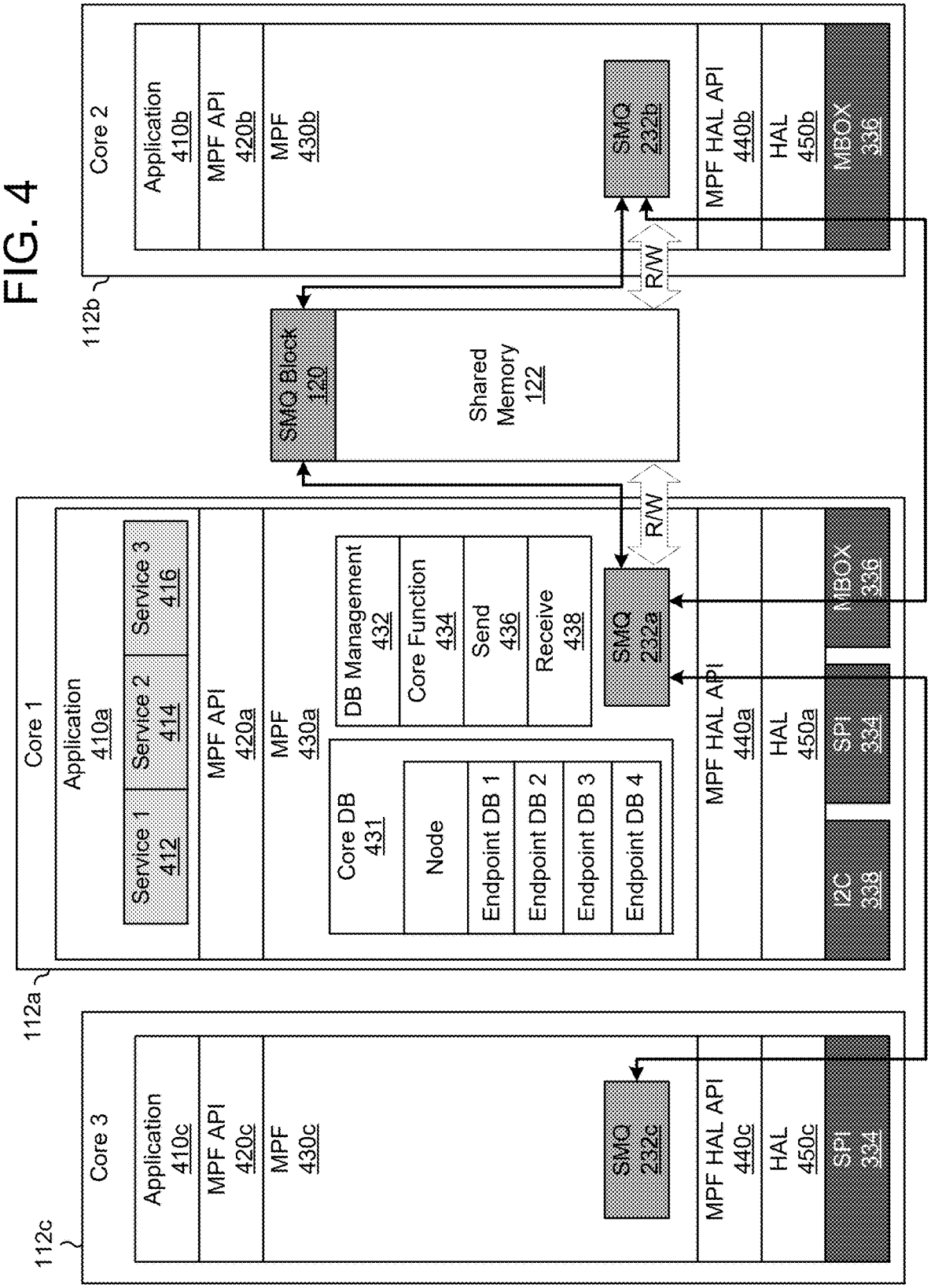
FIG. 4 is a component diagram illustrating an example of communicating between multiple processors using shared memory according to embodiments of the present disclosure.

FIG. 4 is a component diagram illustrating an example of communicating between multiple processors using shared memory according to embodiments of the present disclosure. FIG. 4 illustrates an example representation of how to visualize the device 110 exchanging data between multiple processors using a fourth communication model and a shared queue. For example, the fourth model illustrates that each processor 112 includes multiple layers, such as an application layer 410, a multiprocessor framework (MPF) Application Programming Interface (API) 420, a MPF layer 430, a MPF hardware abstraction layer (HAL) API 440, and a HAL 450a. In addition, the fourth model illustrates that each MPF layer 430 includes an individual SMQ 232, which may coordinate with the SMQ block 120 to store data in the shared memory 122 and/or retrieve data from the shared memory 122.

As illustrated in FIG. 4, a first processor 112a ("Core 1") may include a first application layer 410a, a first MPF API 420a, a first MPF layer 430a, a first MPF HAL API 240a, and a first HAL 450a. Similarly, a second processor 112b ("Core 2") may include a second application layer 410b, a second MPF API 420b, a second MPF layer 430b, a second MPF HAL API 240b, and a second HAL 450b, while a third processor 112c ("Core 3") may include a third application layer 410c, a third MPF API 420c, a third MPF layer 430c, a third MPF HAL API 240c, and a third HAL 450c. As explained above, each processor may include an individual SMQ 232 associated with the MPF layer 430. For example, the first processor 112a may include a first SMQ 232a associated with the first MPF layer 430a, the second processor 112b may include a second SMQ 232b associated with the second MPF layer 430b, and the third processor 112c may include a third SMQ 232c associated with the third MPF layer 430c.

As illustrated in FIG. 4, each of the processors 112a-112c may be configured to communicate using different communication protocol(s) and/or interface(s). For example, the first processor 112a may communicate using a first interface (e.g., SPI 334), a second interface (e.g., MBOX 336), and/or a third interface (e.g., I2C 338). In contrast, the second processor 112b is only configured to communicate using the second interface (e.g., MBOX 336), while the third processor 112c is only configured to communicate using the first interface (e.g., SPI 334). The disclosure is not limited thereto, however, and the number of interfaces and/or type of interfaces may vary without departing from the disclosure.

As illustrated in FIG. 4, the first processor 112a includes additional components, layers, functionality, and/or the like that are not illustrated in the second processor 112b or the third processor 112c. In some examples, the first application layer 410a may include multiple services without departing from the disclosure. For example, FIG. 4 illustrates an example in which the first application layer 410a includes a first service 412 ('Service 1'), a second service 414 ('Service 2'), and a third service 416 ('Service 3'), although the disclosure is not limited thereto.

Additionally or alternatively, in some examples the first MPF layer 430a may include a variety of layers, functionality, etc. in addition to the first SMQ 232a (e.g., SMQ logic). For example, FIG. 4 illustrates an example in which the first MPF layer 430a includes a core database (DB) 431, database (DB) management 432, a core function block 434 (e.g., core function logic), a send block 436 (e.g., send logic, transmission logic, SMQ_TX, Tx thread, etc.), and a receive block 438 (e.g., receive logic, SMQ_RX, RX thread, etc.). As illustrated in FIG. 4, the core database 431 may include information about itself (e.g., Node) and/or a plurality of endpoints (e.g., Endpoint DB 1, Endpoint DB 2, Endpoint DB 3, and Endpoint DB 4), although the disclosure is not limited thereto.

While FIG. 4 illustrates an example in which only the first processor 112a includes the additional blocks described above, the disclosure is not limited thereto and the second processor 112b and/or the third processor 112c may include one or more of these additional blocks without departing from the disclosure. For example, the second processor 112b may include a second receive block 438b configured to receive and/or retrieve data (e.g., payload, notification, and/ or the like) from the first processor 112a without departing from the disclosure.

In the example illustrated in FIG. 4, the first processor 112a is configured to communicate with both the second processor 112b and the third processor 112c via two different communication paths. For example, the first processor 112a may exchange first data with the third processor 112c via a first communication path, represented by a dark arrow connecting the first SMQ 232a with the third SMQ 232c. As illustrated in FIG. 4, the first communication path is associated with the first interface (e.g., SPI 334) and may include the first SMQ 232a, the first MPF HAL API 440a, the first HAL 450a, the third HAL 450c, the third MPF HAL API 440c, and the third SMQ 232c, although the disclosure is not limited thereto.

Similarly, the first processor 112a may exchange second data with the second processor 112b via a second communication path, represented by a dark arrow connecting the first SMQ 232a with the second SMQ 232b. As illustrated in FIG. 4, the second communication path is associated with the second interface (e.g., MBOX 336) and may include the first SMQ 232a, the first MPF HAL API 440a, the first HAL 450a, the second HAL 450b, the second MPF HAL API 440b, and the second SMQ 232b, although the disclosure is not limited thereto.

As illustrated in FIG. 4, the second communication path may also include storing and retrieving data from the SMQ block 120 and/or the shared memory 122. For example, the first SMQ 232a may coordinate with the SMQ block 120 to store the second data in the shared memory 122 and the second SMQ 232b may coordinate with the SMQ block 120 to retrieve the second data from the shared memory 122, although the disclosure is not limited thereto. Examples of sending the second data via the SMQ block 120 and/or the shared memory 122 are described above with regard to FIGS. 1A-1B and will be described in greater detail below with regard to FIGS. 6.

In the multicore communication framework architecture illustrated in FIG. 4, the device 110 defines a common networking layer with data payload management, which takes care of routing the payload between the processors 112a-112c and selects appropriate communication protocol(s) to be used for routing. In some examples, this functionality is designed to interface with any type of communication protocol without having to modify the rest of the system, enabling the device 110 to switch from one protocol to another while using the same communication APIs. For example, the device 110 may define common user network layer APIs for a user profile, create a mechanism for an application (e.g., Service 1) to use the IPC directly (e.g., by creating a logical channel between the processors 112a-112c at the application layer 410), provide network layer interface(s) for various communication protocols, abstract all details of different types of communication protocols from the application layer 410 (e.g., enabling communication without knowing underlying details of the communication mechanism), and/or the like.

In addition, the multicore communication framework architecture illustrated in FIG. 4 may define an IPC driver layer to facilitate communication between the processors 112a-112c. For example, when a data packet is input to the IPC driver layer, the IPC driver layer may manage packet transmission over different communication interface(s) (e.g., bus, shared memory 122, etc.) and/or using different communication protocol(s). In addition, the IPC driver layer may choose an appropriate HW IPC driver with which to send a notification or payload to the remote node (e.g., processor 112 to which the data is being sent), based on a router configuration and/or other parameters.

The core layer of the data transmission is done via the SMQ 232 inside the IPC driver layer. For example, the SMQ 232 may handle payload management and control a flow between the processors 112a-112c when transmitting and/or receiving data. The device 110 may achieve this control flow without any hardware locks (e.g., lock-free mechanism) based on the descriptor structure defined in the management blocks of the shared memory (e.g., SMQ block 120), as will be described in greater detail below with regard to FIGS. 5-6.

Figure 5:
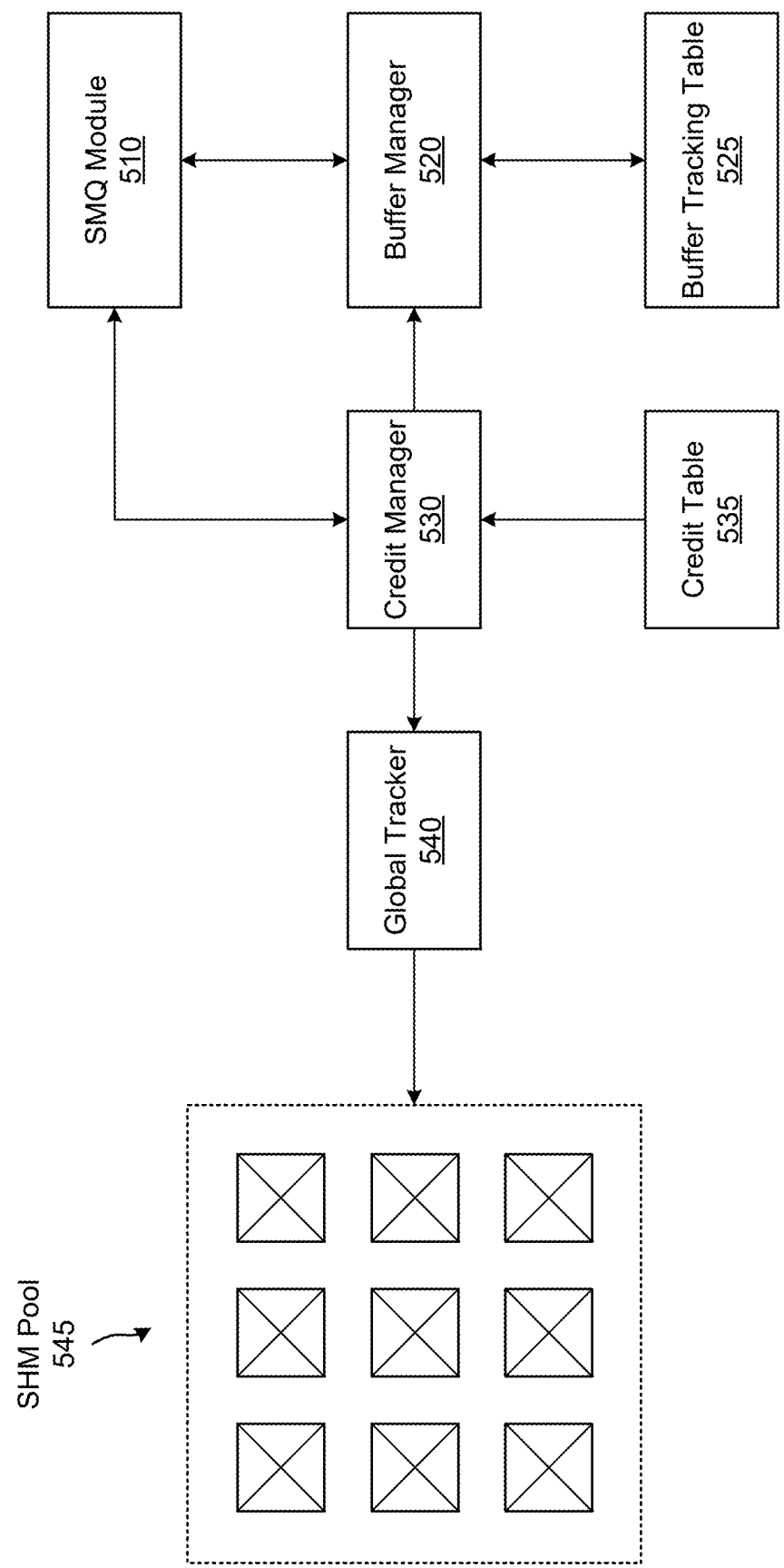
FIG. 5 is a component diagram illustrating an example of a shared queue according to embodiments of the present disclosure.

FIG. 5 is a component diagram illustrating an example of a shared queue according to embodiments of the present disclosure. As illustrated in FIG. 5, the SMQ block 120 and/or the shared memory 122 may include a variety of components to enable the device 110 to perform payload data management and store payload data in the shared memory 122. For example, FIG. 5 illustrates that SMQ management may include a SMQ module 510, a buffer manager 520, a buffer tracking table 525, a credit manager 530, a credit table 535, a global tracker 540, and a shared memory (SHM) pool 545.

Collectively, these components may be referred to as SMQ management, as they are configured to manage the SMQ buffers represented by the SHM pool 545. The SMQ buffers are not contiguous for each node and a buffer slot size may be defined by the user during initialization of the device 110. As will be described in greater detail below, an SMQ buffer descriptor queue is created for each node, although a number of descriptors required for each node is configurable. For example, the SMQ buffer descriptor may include a variety of fields, such as a type (e.g., payload type, such as control message or application payload), an offset value (e.g., offset of the buffer information), a read complete flag (e.g., indicating if the payload has been read by the receiving node), and/or the like, although the disclosure is not limited thereto. Additionally or alternatively, a node descriptor may also include a variety of fields, including a write index, a read index, a queue size, a reference to the SMQ buffer descriptor (e.g., SM_DESC_Q), and/or the like, although the disclosure is not limited thereto.

The shared memory region may be reserved with 4K or 8K for management purpose (e.g., Node Desc and Buffer Desc structure). However, the rest of the shared memory may be used for buffer allocation pool (e.g., SHM pool 545). In some examples, the SHM pool 545 may have a fixed size slot and may pre-allocate a number of slots for respective node interfaces. The device 110 may track this information using the credit table 535. For example, the credit table 535 may maintain information about the local node identification (e.g., local node_id), remote node identification (e.g., remote node_id), interface identification (e.g., interface_id), a maximum number of slots allocated for an individual interface, and/or the like. Each entry in the credit table 535 is unidirectional (e.g., A→B), such that the opposite direction (e.g., B→A) has a separate entry in the credit table 535. In addition, the credit table 535 may store the shared memory region base address, a node description address, a buffer tracker table address, and/or the like. In some examples, the credit table 535 is created at boot time and initialized with a default configuration.

In some examples, the credit manager 530 may have exclusive access to update the credit table 535. For example, the credit manager 530 may have an API exposed to the SMQ module 510, and the SMQ module 510 may expose that API to the MPF layer. Thus, the API flow will be from the MPF layer to the SMQ module 510, then from the SMQ module 510 to the credit manager 530 (e.g., MPF→SMQ→CM). In some examples, the MPF layer can initiate a number of slots and/or change the number of slots through this API flow, resulting in the credit manager 530 updating the new slot information for that node interface. During this update, the buffer manager 520 may be called to free up the existing reserved slots and create the new reserved slots based on the request. If the requested slots number is not available in the shared memory pool 545, the credit manager 530 will return the failure for that request and keep the existing slot information for that node interface. In other words, no update will happen in the credit table if the request is failed.

The buffer manager 520 may be configured to update the buffer tracking table 525. For example, the buffer manager 520 may track the slots usage for that specific interface. In addition, the Application layer can request the slot and free up the slots after usage. The Application request is abstracted by APIs associated with the SMQ module 510. An address of the buffer tracking table 525 may be retrieved from the credit table 535. The buffer tracking table 525 may be managed inside the shared memory management block. The buffer tracking table 525 may manage the slot number allocated for that interface by the credit manager 530. Each slot may have first byte reserved, bit 7 of that is used for marking the availability and bit 0-6 is used to store the slot number.

Each interface (e.g., AP↔MCU or AP↔DSP) may have a separate shared memory region. Thus, the device 110 may create a shared memory (SHM) pool 545 for each shared memory region and use the global tracker 540 for each shared memory region to track the available memory for that shared memory pool 545. For example, the global tracker 540 may provide structure to track available slot(s) within the SHM pool(s) 545.

The credit table 535 is only updated by the credit manager 530. In some examples, the credit manager 530 running on the Application processor (e.g., AP) may have access to update the credit table 535, while other instances of the credit manager 530 running on other nodes (e.g., MCU or DSP) only have read access to the credit table 535. Thus, if the other nodes (e.g., MCU or DSP) want to update the credit table 535, they may do so by requesting that the credit manager 530 running on the application processor update the slot information. This enable the dynamic nature on the shared memory pool 545. A frequency of the update is controlled by the upper layer (e.g., MPF layer), which may control the update request by the client for that node interface.

The credit table 535 is maintained in the private memory of each node. The application processor (primary) may have a master copy of the credit table 535 and share the credit table 535 with other nodes once communication is established between primary and secondary nodes (e.g., AP→MCU). Later, if a secondary node wants to update the credit table 535 with different slot numbers, the secondary node may send a request to the primary node credit manager 530. If that request is valid, the primary node credit manager 530 processes and acknowledges that request. If not, the primary node credit manager 530 sends the failure acknowledge to the secondary node. The SMQ module 510 may use the existing credits to exchange this information. In addition, this message may be treated as a control message by the SMQ module 510, which may intercept this message to update the slot information.

Referring to FIG. 5, the SMQ module 510 may read the node description table from the credit manager 530 and/or the credit manager 530 may perform a credit table update based on a request from the SMQ module 510. In addition, the credit manager 530 may trigger a buffer tracking table update with slot definition(s). For example, the credit manager 530 may send a request to the buffer manager 520 to perform the buffer tracking table update, resulting in the buffer manager 520 updating the buffer tracking table 525. Additionally or alternatively, the SMQ module 510 may send a buffer allocation request to the buffer manager 520.

Figure 6:
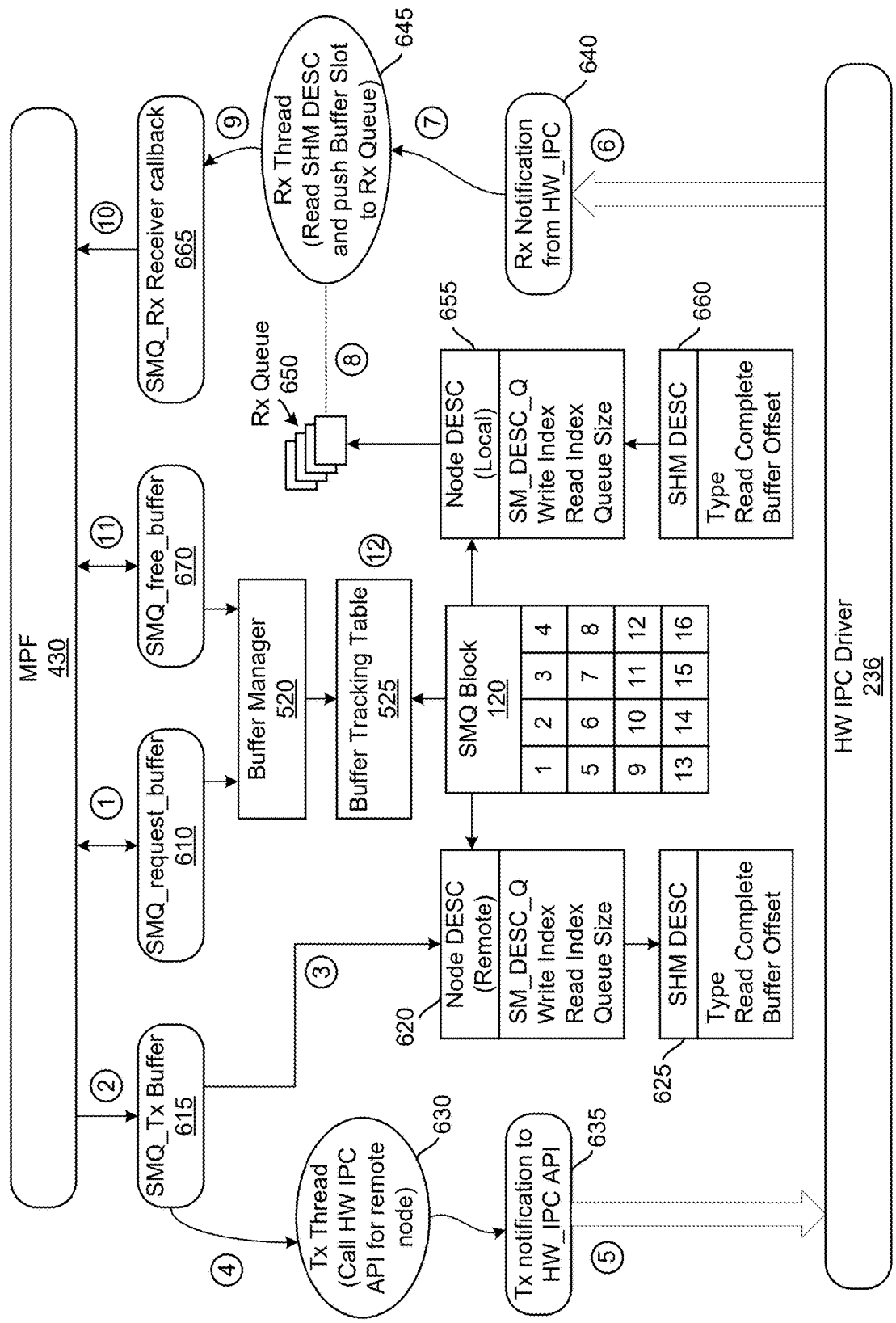
FIG. 6 illustrates an example of interfacing with a shared queue according to embodiments of the present disclosure.

FIG. 6 illustrates an example of interfacing with a shared queue according to embodiments of the present disclosure. As illustrated in FIG. 6, the sequence from 1 to 5 represents the call flow in a first processor 112*a* (e.g., application processor (AP)), while the sequence from 6 to 12 represents the call flow in a second processor 112*b* (e.g., microcontroller unit (MCU)). As illustrated in FIG. 6, the following flow happens at the transmitting node (e.g., Tx Node):

SEQ 1: MPF or upper layer requests a buffer slot, resulting in the buffer manager 520 finding a free slot and returning the free slot address to the caller. In the buffer slot, the first 7 bits are used to store the slot number and an 8th bit used for buffer tracking (e.g., 1 means used, 0 means unused). The buffer slot is allocated by the transmitting node (e.g., Tx node) and freed by the receiving node (e.g., Rx Node). Thus, tracking is managed inside the slot itself and is free from lock.

SEQ 2: MPF or upper layer call SMQ_TX to send the payload to a remote node.

SEQ 3: SMQ_Tx fills the buffer slot address in the SHM descriptor and updates remote NODE descriptor queue.

SEQ 4: SMQ_Tx posts the request to a Tx thread to process that request and find the right HW MPC interface APIs.

SEQ 5: Tx Notification API is called to identify the right interface API for notification. HW_MPC interface API is selected based on the remote node id. For example, during HW_MPC API registration, the remote node (e.g., remote node id) would be associated with that API table.

As illustrated in FIG. 6, the following flow happens at the receiving node (e.g., Rx Node):

SEQ 6: HW MPC interface receive the notification and calls the notification callback function in the SMQ.

SEQ 7: Rx thread receives the notification, reads the local node descriptor and SHM descriptor, and sets the Rx complete flag. Setting the Rx complete flag makes the SHM Queue free in the Node descriptor.

SEQ 8: The buffer slot address is copied to the Rx Queue. Thus, the payload is not copied to the Rx queue, only the buffer slot address is copied to the Rx Queue.

SEQ 9: Calls the callback function registered by the MPF or other upper layer during the initialization.

SEQ 10: MPF or upper layer receives the notification through their callback function and copies the payload from the buffer slot to the local buffer.

SEQ 11: MPF or upper layer calls the SMQ_Free to free up the slot if required.

SEQ 12: Buffer Manger frees up the slot to make it available for the new buffer slot request. For example, the buffer manager 520 may clear up the buffer occupied flag in the buffer slot.

As illustrated in FIG. 6, the shared memory descriptor is used to track the buffer offset of the shared buffer used for this transfer, as well as the type of the payload. The MPF may get the buffer from the shared memory pool and assign this buffer to a respective SHM descriptor for the node.

The SHM Node structure is created for each node in the system. For example, assuming that there are five nodes, then the device 110 needs to have 5 of those structures. For example, the SHM Node structure may contain the SHM descriptor queue, size of the queue, write index, and read index of the queue. In some examples, the device 110 defined the queue size (e.g., slot number) during initialization, with a different queue size based on the node/interface types. Thus, the device 110 can define a bigger queue size where MPC traffic is heavy (e.g., streaming data) with minimal latencies. The device 110 may use an array of SHM descriptor queues to support a multi-channel mode, and an index of that array may be used as priority to process the SHM descriptor queue at the receiver side as well.

The transmission thread (e.g., Tx worker thread, Tx thread, etc.) may monitor the available descriptor to transfer via MPC interface to the specific node. In some examples, the device 110 may include an individual transmission thread for each interface. For example, if the processor 112 (e.g., AP processor) has two interfaces, the device 110 may include two dedicated transmission threads (e.g., Tx worker threads) to handle the request for each interface. The transmission threads may have a common API to call the hardware MPC. The Hardware MPC interface registers upon initialization by the SMQ module 510, and a function hardware MPC table may select the right hardware MPC API for that interface.

The Hardware MPC can have two types of transfer modes:

SYNC mode: Sync mode is nothing but having the shared memory between the processor and notify the remote processor about the payload via MBOX (IPI) or SPI or any other notification mechanism supported.

ASYNC mode (external bus interface): The hardware MPC driver will serialize the payload sent to an external interface (e.g., I2C or SPI), the receiver will receive this payload and de-serialize and send the payload back to the SMQ buffer descriptor, and the MPF will be notified by the SMQ receiver thread. If the MPF or high-level application want to acknowledge the payload, they can do this at the top-level. However, during the asynchronous method the read-index is moved at the time of serialization and the write-index is moved at the time of de-serialization.

The receiving thread (e.g., Rx worker thread, Rx thread, etc.) will read the descriptor queue of the node, and parse the descriptor needed for that receive notification. SMQ API provide the mechanism to register the callback function to enqueue the buffer offset to receiver queue. The receiver thread reads the SHM buffer descriptor and enqueues the buffer offset to a receiver queue (e.g., Rx queue). The MPF will free the buffer after copying the data from the buffer slot to a local buffer of the application.

In some examples, the shared memory may not be used in the MPC communication without departing from the disclosure. Instead, the MPC communication may happen through one of the external interfaces (e.g., SPI, I2C, and/or the like). In this case, the device 110 may use the hardware Input/Output driver (e.g., IO driver) to serialize the data payload and send to the hardware interface driver (e.g., SPI, I2C, etc.) to transmit. On the receiver side, the hardware interface driver will receive this data payload and notify the hardware IO driver. The hardware IO driver will de-serialize the data payload, allocate the buffer slot from the SMQ, and copy that data payload to the buffer slot. In addition, the hardware IO driver may update the SMQ buffer descriptor and Node desc and finally notify the SMQ receiver thread to copy the buffer offset to receiver queue and notify the upper layer or MPF.

The device 110 may use the existing SMQ interface for the upper level or MPF to send and receive the data through hardware MPC. The hardware MPC API may call the hardware IO driver for serialization and de-serialization. The device 110 may define the private memory region for the external interface instead of creating them in shared memory region. A number of slots required for that interface is defined in the credit table. Buffer management and buffer tracker is used as same as shared memory design.

On the receiver side, hardware Interface (SPI/I2C) driver receive that data and notify the hardware IO driver, hardware IO driver request the buffer slot and copy that data back to the buffer slot and synchronize the Node descriptor structure and SHM descriptor structure for the SMQ to process and complete the receiver flow.

As illustrated in FIG. 6, the device 110 may send a request to the buffer manager 520 for an available buffer slot (step "1"). For example, the MPF layer 430 may send a request to the buffer manager 520 by calling a first function (e.g., SMQ_request_buffer 610) and the buffer manager 520 may identify an available buffer slot (e.g., free slot) using the buffer tracking table 525 and return a memory address (e.g., free slot address) to the MPF layer 430. The MPF layer 430 may then call a second function (e.g., SMQ_Tx buffer 615) to send a payload to the remote node (step "2"). In response, the SMQ 232 (e.g., SMQ_Tx buffer 615) may fill a buffer slot address in a SHM descriptor 625 and/or update a remote node descriptor queue 620 (step "3"). In addition, the SMQ 232 (e.g., SMQ_Tx buffer 615) may post the request to a transmission thread (e.g., Tx thread 630) to process the request and find the correct HW IPC interface APIs (step "4"). For example, the transmission thread may call HW IPC API associated with the remote node stored in the node descriptor queue 620, although the disclosure is not limited thereto. To complete the transmission process, the device 110 may transmit a notification to the remote node (step "5"). For example, the transmission process may call a third function (e.g., Tx Notification API) and/or use the HW IPC API previously selected based on the remote node identifier. Thus, the local node may transmit a notification (e.g., Tx notification to HW_IPC API 635) to a first HW IPC driver 236a associated with the local node (e.g., transmission node), which will send the notification to a second HW IPC driver 236b associated with the remote node.

As illustrated in FIG. 6, the remote node (e.g., receiving node) may receive the notification from the local node (step "6"). For example, the second HW IPC driver 236b may receive the notification and call the notification callback function in the SMQ 232 (e.g., Rx notification from HW_IPC 640). This triggers a receiving thread to receive the notification, read the local node descriptor 655 and the SHM descriptor 660, and set a read complete flag (step "7"). For example, setting the read complete flag (e.g., Rx complete flag) makes the SHM queue free in the local node descriptor 655 (e.g., Node DESC (Local)). In addition, the receiving thread (e.g., Rx thread 645) may also copy the buffer slot address to a receiving queue (e.g., Rx queue 650), without copying the payload (step "8"). For example, FIG. 6 illustrates that the Rx thread 645 may "read SHM DESCP and push buffer slot to Rx queue."

As illustrated in FIG. 6, the receiving thread (e.g., Rx thread 645) may call a callback function registered by the MPF layer during initialization (step "9"). For example, the receiving thread (e.g., Rx thread 645) may call a fourth function (e.g., SMQ_Rx Receiver callback 665), causing the MPF layer 430 to receive a notification. Thus, the MPF layer 430 may receive the notification and copy the payload from the buffer slot to a local buffer (step "10"). In addition, the MPF layer 430 may call a fifth function (e.g., SMQ_free_buffer 670) to free up the slot, if required (step "11"). For example, the MPF layer 430 may call the fifth function to instruct the buffer manager 520 to free up the slot in the buffer tracking table 525, making the slot available for a new buffer slot request (step "12").

FIGS. 7A-7B are network communication diagrams conceptually illustrating an example of exchanging data between multiple processors according to embodiments of the present disclosure. FIG. 7A illustrates an example of the first processor 112a sending data using the first SMQ 232a (e.g., Tx thread), which corresponds to steps 1-5 illustrated in FIG. 6. In contrast, FIG. 7B illustrates an example of the second processor 112b retrieving data using the second SMQ 232b (e.g., Rx thread), which corresponds to steps 6-12 in FIG. 6.

As illustrated in FIG. 7A, the first MPF layer 430a may request (710) a buffer slot from the first SMQ 232a and the first SMQ 232a may send (712) a slot number for a free slot to the first MPF layer 430a. For example, the first MPF layer 430a may request an available buffer slot and the first SMQ 232a may (i) identify an available buffer slot in the shared memory 122 (e.g., first location in the shared memory) and (ii) send a first memory address associated with the first location. After receiving the first memory address associated with the first location (e.g., slot number for the free slot), the first MPF layer 430a may call (714) the first SMQ 232a (e.g., SMQ_TX) to send a payload to a remote node (e.g., second processor 112b). In some examples, the first MPF layer 430a may use the first memory address to store the payload in the first location in step 714 without departing from the disclosure. The disclosure is not limited thereto, however, and in other examples the first MPF layer 430a may send the payload to the first SMQ 232a and the first SMQ 232a may store the payload in the first location without departing from the disclosure.

As illustrated in FIG. 7A, the first SMQ 232a may fill (716) a buffer slot address (e.g., first memory address) in the SHM descriptor and update a remote node descriptor queue associated with the first location in the shared memory 122, as described in greater detail above with regard to FIG. 6. In addition, the first SMQ 232a may post (718) a request to a transmission thread (e.g., Tx thread) to process that request and to find the destination interface API (e.g., determine HW MPC interface API(s) associated with the remote node). Similarly, the first SMQ 232a may determine (720) interface APIs with which to send a notification to the remote node. For example, the first SMQ 232a may call a first interface API (e.g., Tx notification API) to send the notification to the remote node and may select the HW MPC interface API associated with the remote node (e.g., using a lookup table or API table).

Using the destination interface API and/or the first interface API, the first SMQ 232a may send (722) a notification (e.g., Tx notification) to the first MPF HAL API 440a and the first MPF HAL API 440a may send (724) the notification to the second MPF HAL API 440b associated with the second processor 112b.

As illustrated in FIG. 7B, in response to receiving the notification the second MPF HAL API 440b may call (726) a notification callback function. For example, the second MPF HAL API 440b may call a notification callback function using the second SMQ 232b, although the disclosure is not limited thereto.

In response to the notification callback function, the second SMQ 232b may read (728) the local node descriptor and/or the SHM descriptor from the SMQ block 120 and/or the shared memory 122 using the receiving thread (e.g., Rx thread). In addition, the second SMQ 232b may set (730) a receive complete flag (e.g., Rx complete flag) using the receiving thread (e.g., Rx thread). For example, setting the receive complete flag updates the node descriptor to indicate that the SHM queue is free.

The second SMQ 232b may copy (732) the buffer slot address (e.g., first memory address associated with the first location) to the receive queue (e.g., Rx queue) and may call (734) a callback function for the second MPF layer 430b. For example, the second SMQ 232b may copy only the buffer slot address to the Rx queue, the payload itself is not copied ot the Rx queue in this step.

As illustrated in FIG. 7B, the second MPF layer 430b may receive (736) a notification through the callback function called in step 734 and may copy (738) the payload from the buffer slot to a local buffer associated with the second processor 112b. For example, the second MPF layer 430b may retrieve the payload from the first location in the shared memory 122 and may store the payload in a local buffer for further processing.

After retrieving the payload from the first location, the second MPF layer 430b may send (740) a call or notification (e.g., call SMQ_Free) to free up the buffer slot and the second SMQ 232b may free (742) the buffer slot. For example, the second SMQ 232b may free the first location so that it may be used to exchange data between processors 112 in the future.

Figure 8A:
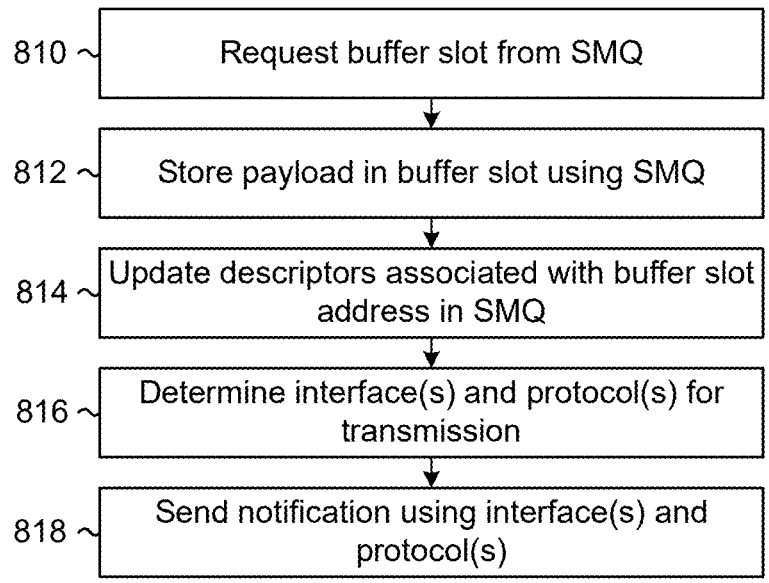
FIGS. 8A-8B are flowcharts conceptually illustrating an example of exchanging data between multiple processors according to embodiments of the present disclosure.
Figure 8B:
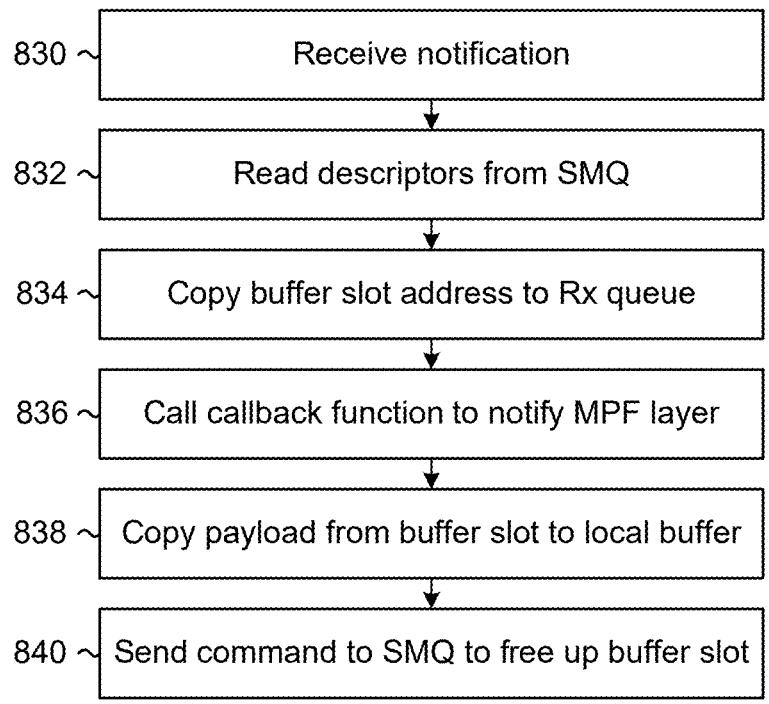

FIGS. 8A-8B are flowcharts conceptually illustrating an example of exchanging data between multiple processors according to embodiments of the present disclosure. As illustrated in FIG. 8A, the first processor 112a may request (810) a buffer slot from the first SMQ 232a and may store (812) a payload in the buffer slot using the first SMQ 232a. In addition, the first processor 112a may update (814) descriptors associated with the buffer slot address in the SMQ block 120 and/or the shared memory 122. For example, the first processor 112a may update the SHM descriptor and/or the remote node descriptor queue, as described in greater detail above with regard to FIG. 6.

The first processor 112a may then determine (816) interface(s) and/or communication protocol(s) for transmission (e.g., sending a notification to the second processor 112b) and may send (818) the notification to the second processor 112b using the interface(s) and/or communication protocol(s) determined in step 816.

As illustrated in FIG. 8B, the second processor 112b may receive (830) the notification from the first processor 112a, may read (832) descriptors from the SMQ block 120 and/or the shared memory 122, and may copy (834) the buffer slot address to the Rx queue. In addition, the second processor 112b may call (836) a callback function to notify the second MPF layer 430b, may copy (838) the payload from the buffer slot to a local buffer, and may send (840) a command to the SMQ block 120 to free up the buffer slot.

FIG. 9 is a block diagram conceptually illustrating a device 110 that may be used with the system. The device 110 may include one or more controllers/processors 904, which may each include a central processing unit (CPU) for processing data and computer-readable instructions, and a memory 906 for storing data and instructions of the respective device. The memories 906 may individually include volatile random access memory (RAM), non-volatile read only memory (ROM), non-volatile magnetoresistive memory (MRAM), and/or other types of memory. The device 110 may also include a data storage component 908 for storing data and controller/processor-executable instructions. Each data storage component 908 may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces 902.

Computer instructions for operating the device 110 and its various components may be executed by the respective device's controller(s)/processor(s) 904, using the memory 906 as temporary "working" storage at runtime. A device's computer instructions may be stored in a non-transitory manner in non-volatile memory 906, data storage component 908, or an external device(s). Alternatively, some or all of the executable instructions may be embedded in hardware or firmware on the respective device in addition to or instead of software.

The device 110 includes input/output device interfaces 902. A variety of components may be connected through the input/output device interfaces 902, as will be discussed further below. Additionally, the device 110 may include an address/data bus 924 for conveying data among components of the respective device. Each component within the device 110 may also be directly connected to other components in addition to (or instead of) being connected to other components across the bus 924.

Via antenna(s) (not shown), the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. The I/O device interface 902 may also include communication components that allow data to be exchanged between devices such as different physical servers in a collection of servers or other components.

Referring to FIG. 9, the I/O device interface 902 may be configured to provide communications between the device 110 and other devices via the network(s) 199. For example, the I/O device interface 902 may provide communications between the device 110 and other devices 110, network component(s), docking stations, routers, access points, and so forth, for example through antenna and/or other components. The antenna can receive and transmit RF signals. For example, the antenna may be configured to convert electromagnetic waves into electrical signals or vice versa.

In some examples, the device 110 may include a dual-band RF transceiver configured to exchange data or connect to the Internet using radio waves in two WLAN bands (2.4 GHz band, 5 GHz band) via one or multiple antennas. For example, a dual-band WLAN RF transceiver may include a 5 GHZ WLAN channel and a 2.4 GHZ WLAN channel. Additionally or alternatively, the device 110 may include additional transceivers that operate in sub-GHz, 2.45 GHz, 5 GHZ, and/or the like, although the disclosure is not limited thereto.

The I/O device interface 902 may include one or more of a wireless area network (WAN) interface (e.g., cellular radio), a wireless local area network (WLAN) interface (e.g., radio using Wi-Fi® protocols), a personal area network (PAN) interface (e.g., radio using Bluetooth® protocols), secondary radio frequency (RF) link interface (e.g., a sub-GHz radio), and/or other interfaces. The WLAN interface may be compliant with at least a portion of the Wi-Fi® specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth®, wireless USB, Z-Wave®, ZigBee®, or other standards. For example, the PAN interface may be compliant with the Bluetooth Low Energy (BLE) specification. Thus, the network interface(s) 1019 may include components compatible with Ethernet, Wi-Fi®, Bluetooth®, Bluetooth Low Energy, ZigBee®, and so forth, although the disclosure is not limited thereto.

The device 110 may include a secondary RF link interface that comprises a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth.

The WAN interface may create a cellular connection between the device 110 and a device in a cellular network, such as the network component(s). The WLAN interface may create a wireless connection using a first frequency range (e.g., 2.4 GHz radio) and/or a second frequency range (e.g., 5 GHz radio). The PAN interface may create a wireless connection using the first frequency range. In some examples, more than one 2.4 GHz radio may be used for more wireless connections. Additionally or alternatively, a different number of 5 GHz radios may be used for more or less wireless connections with other nodes.

The components of the device 110 may include their own dedicated processors, memory, and/or storage. Alternatively, one or more of the components of the device 110 may utilize the I/O interfaces 902, processor(s) 904, memory 906, and/or data storage component 908 of the device 110.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system 100 may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system 100 may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   requesting, by a first processor of a device from first smart message queue (SMQ) logic associated with the first processor, a first memory address associated with shared memory of the device;
   receiving, by the first processor from the first SMQ logic, the first memory address, wherein the first memory address indicates a first location within the shared memory;
   storing, by the first processor using the first SMQ logic, first data in the first location;
   storing, by the first processor using the first SMQ logic, second data within the shared memory, the second data indicating at least the first memory address and a second processor of the device;
   determining, by the first processor using the first SMQ logic, that the second processor is associated with a first communication protocol and a first hardware interface;
   sending, from the first processor to the second processor using the first communication protocol and the first hardware interface, a first notification;
   in response to receiving the first notification, retrieving, by the second processor, the second data from the shared memory;
   determining, by the second processor using the second data, the first memory address;
   retrieving, by the second processor and using the first memory address, the first data from the first location; and
   storing, by the second processor, the first data in a buffer associated with the second processor.

2. The computer-implemented method of claim 1, further comprising:
   receiving, by the second processor, the first notification;
   invoking, by the second processor, a notification callback function corresponding to second SMQ logic associated with the second processor; and
   retrieving, by the second SMQ logic, the second data from the shared memory.

3. The computer-implemented method of claim 1, further comprising:
   setting, by the second processor, a first flag corresponding to the first memory address; and
   updating the first location in the shared memory to make the first location available for future requests.

4. The computer-implemented method of claim 1, wherein requesting the first memory address further comprises:
   sending, from a first layer associated with the first processor to the first SMQ logic, a request for an available slot address in the shared memory, and
   the method further comprises:
      determining, by the first SMQ logic, that the first location is available;
      determining, by the first SMQ logic, the first memory address corresponding to the first location; and
      sending, from the first SMQ logic to the first layer, the first memory address.

5. A computer-implemented method, the method comprising:
   determining, by a first processor of a device, a second processor of the device to which to send first data;
   storing, by the first processor, the first data in a first location within shared memory of the device;
   storing, by the first processor, second data within the shared memory, the second data indicating at least the first location and the second processor;
   determining, by the first processor, at least one communication protocol associated with the second processor;
   sending, from the first processor to the second processor using the at least one communication protocol, a first notification;
   in response to receiving the first notification, retrieving, by the second processor, the second data from the shared memory;
   retrieving, by the second processor and using the second data, the first data from the first location; and
   storing, by the second processor, the first data in a buffer associated with the second processor.

6. The computer-implemented method of claim 5, further comprising:
   requesting, by the first processor from smart message queue (SMQ) logic associated with the first processor, a first memory address associated with shared memory of the device; and
   receiving, by the first processor from the SMQ logic, the first memory address, wherein the first memory address indicates the first location.

7. The computer-implemented method of claim 5, further comprising:
   sending, from a first layer associated with the first processor to smart message queue (SMQ) logic associated with the first processor, a request for an available slot address in the shared memory;
   determining, by the SMQ logic, that the first location is available;
   determining, by the SMQ logic, a first memory address corresponding to the first location; and
   sending, from the SMQ logic to the first layer, the first memory address.

8. The computer-implemented method of claim 5, further comprising:
   requesting, by the first processor from smart message queue (SMQ) logic associated with the first processor, a first memory address associated with shared memory of the device; and
   determining, by the SMQ logic, the first memory address, wherein the first memory address indicates the first location,
   wherein the SMQ logic stores the first data in the first location and the second data in the shared memory.

9. The computer-implemented method of claim 5, further comprising:
   receiving, by the second processor, the first notification; and
   invoking, by the second processor, a notification callback function corresponding to smart message queue (SMQ) logic associated with the second processor,
   wherein the second data is retrieved from the shared memory by the SMQ logic.

10. The computer-implemented method of claim 5, further comprising:
    setting, by the second processor, a first flag corresponding to the first location; and
    updating the first location in the shared memory to make the first location available for future requests.

11. The computer-implemented method of claim 5, further comprising:

receiving, by a first layer associated with the second processor, the first notification;

determining, by the first layer and using the second data, a first memory address associated with the first location; and sending, to a second layer associated with the second processor, a second notification, wherein storing the first data in the buffer further comprises:

in response to the second notification, storing, by the second layer and using the first memory address, the first data in the buffer.

12. The computer-implemented method of claim 5, wherein determining the at least one communication protocol further comprises:

determining that the second processor is associated with a first communication protocol; and determining that the second processor is associated with a first hardware interface, wherein the first notification is sent to the second processor using the first communication protocol and the first hardware interface.

13. A system comprising:

at least one processor; and memory including instructions operable to be executed by the at least one processor to cause the system to:

determine, by a first processor of a device, a second processor of the device to which to send first data;

store, by the first processor, the first data in a first location within shared memory of the device;

store, by the first processor, second data within the shared memory, the second data indicating at least the first location and the second processor;

determine, by the first processor, at least one communication protocol associated with the second processor;

send, from the first processor to the second processor using the at least one communication protocol, a first notification;

in response to receiving the first notification, retrieve, by the second processor, the second data from the shared memory;

retrieve, by the second processor and using the second data, the first data from the first location; and store, by the second processor, the first data in a buffer associated with the second processor.

14. The system of claim 13, wherein the memory further comprises instructions that, when executed by the at least one processor, further cause the system to:

request, by the first processor from smart message queue (SMQ) logic associated with the first processor, a first memory address associated with shared memory of the device; and receive, by the first processor from the SMQ logic, the first memory address, wherein the first memory address indicates the first location.

15. The system of claim 13, wherein the memory further comprises instructions that, when executed by the at least one processor, further cause the system to:

send, from a first layer associated with the first processor to smart message queue (SMQ) logic associated with the first processor, a request for an available slot address in the shared memory;

determine, by the SMQ logic, that the first location is available;

determine, by the SMQ logic, a first memory address corresponding to the first location; and send, from the SMQ logic to the first layer, the first memory address.

16. The system of claim 13, wherein the memory further comprises instructions that, when executed by the at least one processor, further cause the system to:

request, by the first processor from smart message queue (SMQ) logic associated with the first processor, a first memory address associated with shared memory of the device; and determine, by the SMQ logic, the first memory address, wherein the first memory address indicates the first location, wherein the SMQ logic stores the first data in the first location and the second data in the shared memory.

17. The system of claim 13, wherein the memory further comprises instructions that, when executed by the at least one processor, further cause the system to:

receive, by the second processor, the first notification; and invoke, by the second processor, a notification callback function corresponding to smart message queue (SMQ) logic associated with the second processor, wherein the second data is retrieved from the shared memory by the SMQ logic.

18. The system of claim 13, wherein the memory further comprises instructions that, when executed by the at least one processor, further cause the system to:

set, by the second processor, a first flag corresponding to the first location; and update the first location in the shared memory to make the first location available for future requests.

19. The system of claim 13, wherein the memory further comprises instructions that, when executed by the at least one processor, further cause the system to:

receive, by a first layer associated with the second processor, the first notification;

determine, by the first layer and using the second data, a first memory address associated with the first location;

send, to a second layer associated with the second processor, a second notification; and in response to the second notification, store, by the second layer and using the first memory address, the first data in the buffer.

20. The system of claim 13, wherein the memory further comprises instructions that, when executed by the at least one processor, further cause the system to:

determine that the second processor is associated with a first communication protocol; and determine that the second processor is associated with a first hardware interface, wherein the first notification is sent to the second processor using the first communication protocol and the first hardware interface.

* * * * *